(12) United States Patent
Hatje et al.

(10) Patent No.: US 12,240,642 B2
(45) Date of Patent: Mar. 4, 2025

(54) SYSTEMS AND METHODS FOR THE APPLICATION AND SEALING OF END CLOSURES ON CONTAINERS

(71) Applicant: Sonoco Development, Inc., Hartsville, SC (US)

(72) Inventors: Dirk Hatje, Mannheim (DE); Daniel Christoph Gräf, Mutterstadt (DE)

(73) Assignee: Sonoco Development, Inc., Hartsville, SC (US)

( * ) Notice: Subject to any disclaimer, the term of this patent is extended or adjusted under 35 U.S.C. 154(b) by 246 days.

(21) Appl. No.: 17/459,238

(22) Filed: Aug. 27, 2021

(65) Prior Publication Data

US 2022/0063855 A1 Mar. 3, 2022

Related U.S. Application Data

(60) Provisional application No. 63/071,076, filed on Aug. 27, 2020.

(51) Int. Cl.
*B65B 51/20* (2006.01)
*B65B 7/28* (2006.01)
*B65B 51/22* (2006.01)

(52) U.S. Cl.
CPC .............. *B65B 51/20* (2013.01); *B65B 7/285* (2013.01); *B65B 7/2878* (2013.01); *B65B 51/227* (2013.01)

(58) Field of Classification Search
CPC ....... B65B 51/20; B65B 51/227; B65B 7/285; B65B 7/2878
See application file for complete search history.

(56) References Cited

U.S. PATENT DOCUMENTS 2,859,575 A * 11/1958 Lehmann .............. B65B 7/2878
264/296
4,071,598 A 1/1978 Meadors
(Continued)

FOREIGN PATENT DOCUMENTS

| CN | 101503121 A | 8/2009 |
|---|---|---|
| DE | 2643489 A1 | 4/1977 |

(Continued)

OTHER PUBLICATIONS

International Search Report and Written Opinion for International application No. PCT/US2021/047880 dated Jan. 7, 2022; 12 pages.
(Continued)

*Primary Examiner* — Joshua G Kotis
*Assistant Examiner* — Scott A Howell
(74) *Attorney, Agent, or Firm* — Nelson Mullins Riley & Scarborough LLP

(57) ABSTRACT

The invention is directed to a system and method for hermetically sealing a closure to a container comprising a die assembly and a mandrel assembly. The mandrel assembly comprises an outer mandrel, an inner mandrel, and an ejector disposed within an inner circumference of the inner mandrel. At least the outer mandrel is configured to translate a first distance in a first time period, the inner mandrel and the ejector are configured to translate a second distance in a second time period, the inner mandrel is configured to retract a third distance in a third time period, and the ejector is configured to retract the third distance in a fourth time period.

26 Claims, 33 Drawing Sheets

(56) References Cited

U.S. PATENT DOCUMENTS

| | | | |
|---|---|---|---|
| 4,098,404 | A | 7/1978 | Rupert |
| 4,579,275 | A * | 4/1986 | Peelman .................. B29C 71/02 |
| | | | 425/436 R |
| 4,591,055 | A | 5/1986 | Corn |
| 4,599,123 | A | 7/1986 | Christensson |
| 4,724,654 | A * | 2/1988 | Dahlin .................. B29C 66/545 |
| | | | 53/361 |
| 4,736,572 | A | 4/1988 | Fang et al. |
| 4,989,394 | A | 2/1991 | Berg et al. |
| 5,720,593 | A * | 2/1998 | Pleake ..................... B65B 57/10 |
| | | | 414/789.9 |
| 10,882,648 | B2 | 1/2021 | Sireix |
| 11,572,205 | B2 | 2/2023 | Horz |
| 2002/0185402 | A1 | 12/2002 | Boatwright |
| 2003/0131568 | A1 | 7/2003 | Rossi et al. |
| 2003/0215587 | A1 | 11/2003 | Fatica et al. |
| 2013/0092312 | A1 | 4/2013 | Cassoni et al. |
| 2013/0092697 | A1 * | 4/2013 | Guzzi ...................... B65D 3/22 |
| | | | 220/626 |
| 2019/0152631 | A1 * | 5/2019 | Sireix ................... B65B 7/2878 |
| 2020/0009819 | A1 | 1/2020 | Cassoni et al. |
| 2020/0189791 | A1 | 6/2020 | Dregger et al. |

FOREIGN PATENT DOCUMENTS

| | | |
|---|---|---|
| EP | 0357276 A1 | 3/1990 |
| EP | 1151937 A1 | 11/2001 |
| EP | 1595802 A2 | 11/2005 |
| EP | 1842776 A2 | 10/2007 |
| EP | 2308758 A1 | 4/2011 |
| EP | 2374730 A1 | 10/2011 |
| EP | 3486186 A1 | 5/2019 |
| GB | 1161022 A | 8/1969 |
| GB | 1187302 | 4/1970 |
| WO | 1997006063 A1 | 2/1997 |
| WO | 0012387 A1 | 3/2000 |
| WO | 2011146087 A1 | 11/2011 |
| WO | 2013056205 A2 | 4/2013 |

OTHER PUBLICATIONS

International Search Report and Written Opinion for International application No. PCT/US2021/047883 dated Dec. 14, 2021; 13 pages.

International Search Report and Written Opinion issued in International application No. PCT/US2021/047890 dated Dec. 7, 2021; 13 pages.

Non-Final office action in U.S. Appl. No. 17/459,283, Dated Jan. 17, 2024, 19 pages [only new art cited herein].

Final office action in U.S. Appl. No. 17/459,259, dated Feb. 12, 2024, 8 pages [only new art cited herein].

Final Office Action issued in U.S. Appl. No. 17/459,283 on Apr. 22, 2024; 15 pages.

* cited by examiner

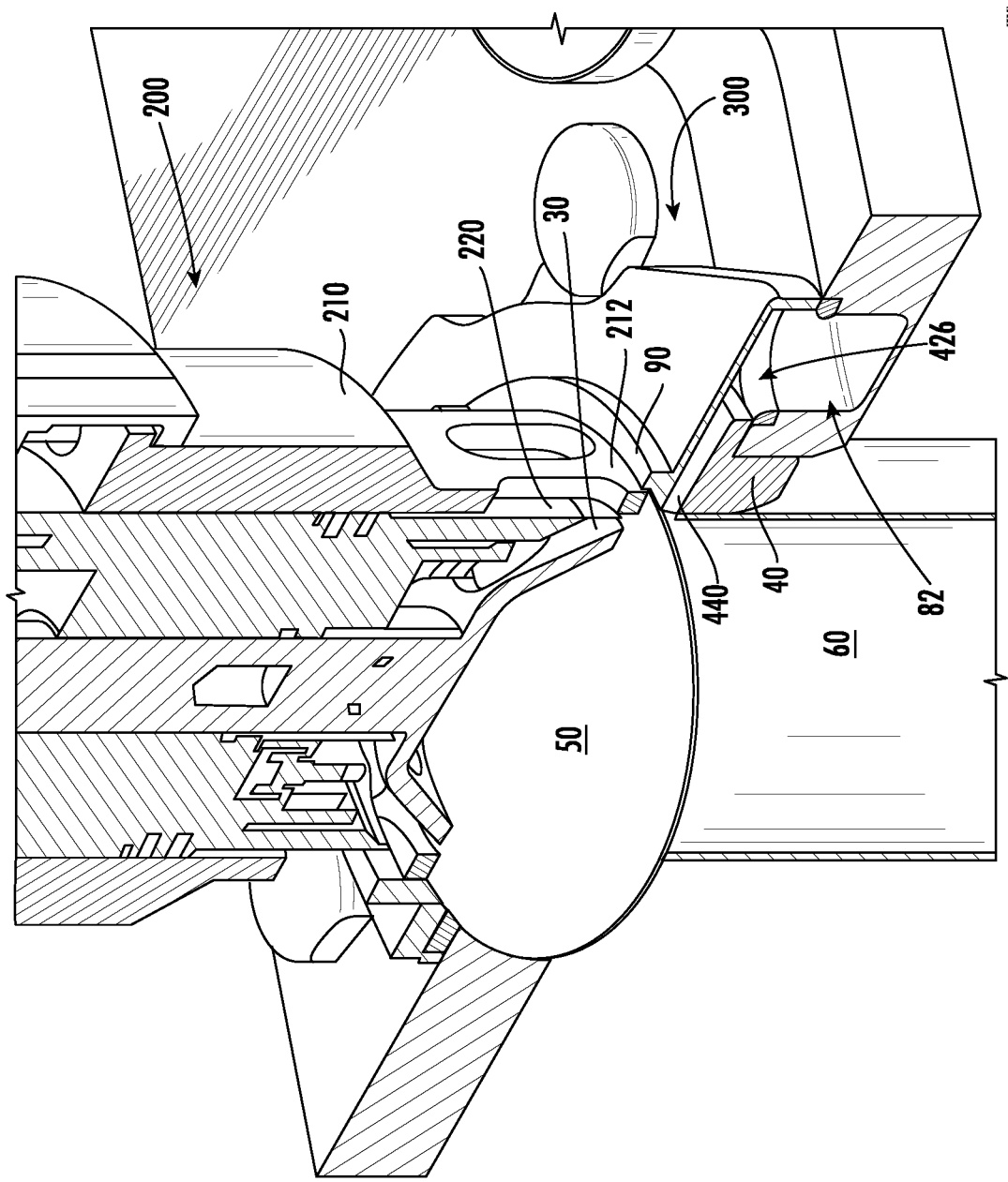

SYSTEMS AND METHODS FOR THE APPLICATION AND SEALING OF END CLOSURES ON CONTAINERS

CROSS-REFERENCE TO RELATED APPLICATIONS

This application claims priority to U.S. Provisional Patent Application No. 63/071,076, filed Aug. 27, 2020, entitled "SYSTEMS AND METHODS FOR THE APPLICATION AND SEALING OF PAPER-BASED END CLOSURES ON COMPOSITE CONTAINERS", wherein the foregoing is incorporated by reference in its entirety herein.

FIELD OF THE INVENTION

The present invention relates generally to systems and methods for formation and sealing of containers with closures.

BACKGROUND OF THE INVENTION

The present disclosure relates generally to containers and methods of sealing such containers. Paper-based or composite containers are often used for snack foods and similar products. Such containers often have a peelable/removable membrane sealed to a top rim of the container, a removable/replaceable overcap or end cap covering the membrane, and a metal closure seamed onto a bottom rim of the container. Typically, the membrane is first sealed to the top rim. The container is then filled with the products through the open bottom end of the container and the metal closure is seamed onto the bottom rim of the container.

The process described above, using metal bottom ends, interferes with the recyclability of the container, as seaming the metal closure to the bottom of the container makes it very difficult to separate the metal closure from the container itself after use. Without the ability to separate the paper-based body of the container from the metal bottom, the container assembly is unable to enter either the paper or metal recycling stream. This may result in unnecessary waste and negative environmental impacts. There exists a need for recyclable containers in order to increase the sustainability of the end product.

One solution to the need for recyclability is to produce containers with paper-based end closures rather than metal ends. However, the existing equipment for seaming metal ends to containers is built specifically for metal ends, and simply swapping out metal closures for paper-based end closures is incompatible with the current metal end seaming process, as paper-based end closures introduce unique challenges not present with metal ends (e.g., flexibility of the closures, separating the closures from a stack of closures, feeding the closures, folding the closures, fusing the non-metal closures). Through ingenuity and hard work, the inventors have not only developed systems and methods for applying paper-based end closures to containers, but have also developed systems and methods that operate at high speeds (e.g., over 250 containers per minute).

SUMMARY OF THE INVENTION

In an embodiment, the invention comprises a sealing tool set for sealing a bottom onto a container with an integrated, controlled ejector utilized in retracting the mandrel from the container bottom (i.e. during the outfeed process). In a particular embodiment, the invention comprises a method and a sealing system for hermetically sealing a closure to a container comprising: a die assembly comprising: a die having a positioning portion configured to retain a disc and a die opening adjacent the positioning portion; and at least one sealing member configured to provide heat to seal the disc to the container; and a mandrel assembly comprising: an outer mandrel comprising an extending portion which is sized to fit within an inner circumference of the positioning portion; an inner mandrel configured to translate through an inner circumference of the extending portion of the outer mandrel and the die opening; and an ejector disposed within an inner circumference of the inner mandrel, wherein at least the outer mandrel is configured to translate a first distance in a first time period, wherein the inner mandrel and the ejector are configured to translate a second distance in a second time period, wherein the inner mandrel is configured to retract a third distance in a third time period, wherein the ejector is configured to retract the third distance in a fourth time period, wherein each of the first distance, the second distance, and the third distance are different from each other. In an embodiment, the outer mandrel, the inner mandrel, and the ejectors extend, translate, and retract parallel to one another. In an embodiment, the outer mandrel extends and retracts vertically, the inner mandrel translates and retracts vertically, and the ejector translates and retracts vertically.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 28 illustrates a cross-section of an exemplary sealed container assembly, in accordance with some embodiments of the present disclosure.

Figure 1:
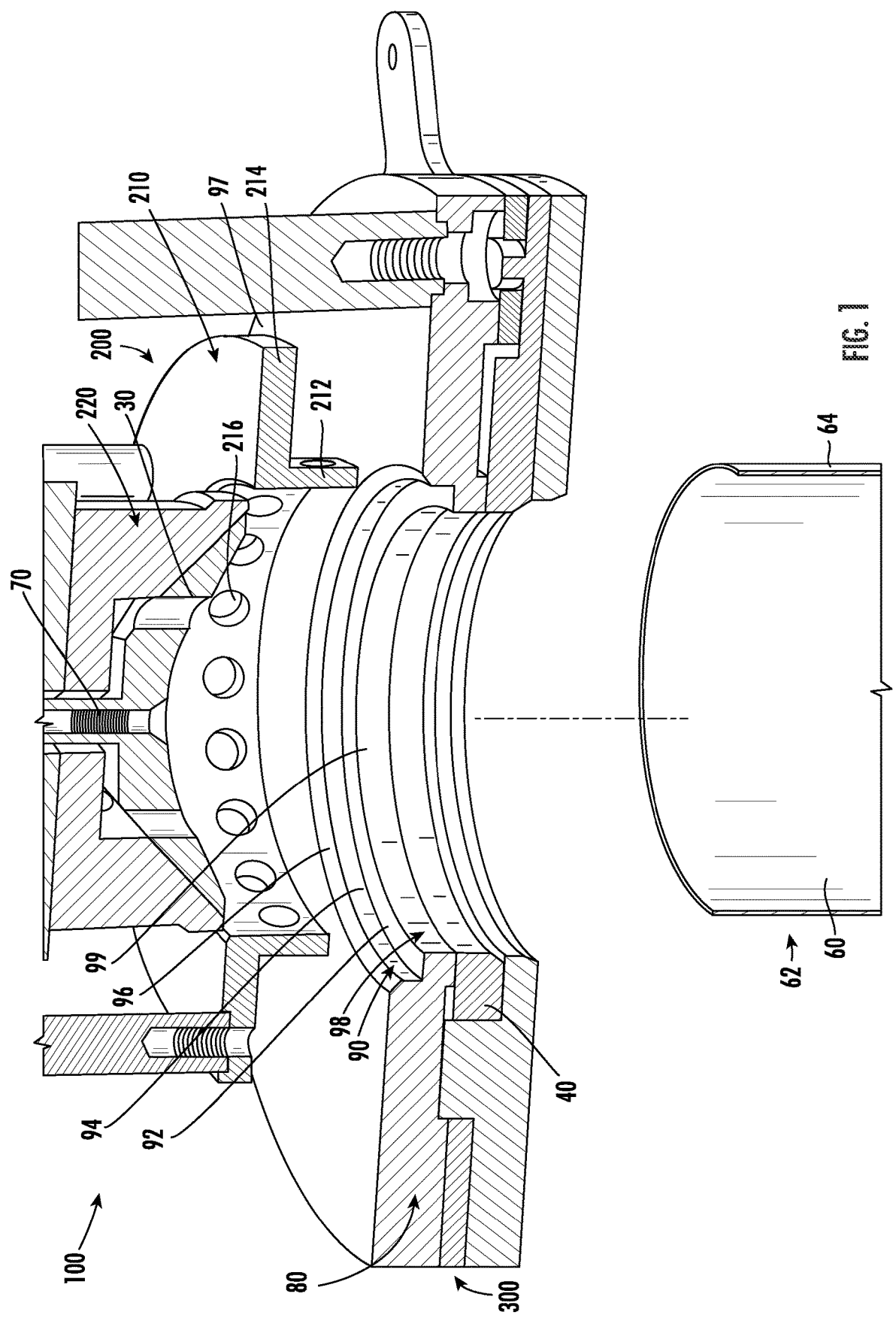
FIG. 1 illustrates an exemplary sealing system in accordance with an embodiment of the invention.

Repeated use of reference characters in the present specification and drawings is intended to represent the same or analogous features or elements of the invention.

DETAILED DESCRIPTION

Reference will now be made in detail to embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In an embodiment, the invention comprises a device and method for manufacture of high barrier packages for perishable products, such as hermetically closed containers for packaging humidity- and oxygen-sensitive solid food products. The containers produced according to the devices and methods described herein may be capable of sustaining a variety of atmospheric conditions when filled and closed. More specifically, the hermetically closed containers may be suitable for maintaining the freshness of crisp food products such as, for example, potato chips, processed potato snacks, nuts, and the like. As used herein, the term "hermetic" refers to the property of sustaining an oxygen ($O_2$) level with a barrier such as, for example, a seal, a surface or a container.

In an embodiment, the systems and methods described herein may produce hermetically sealed containers having a wholly paper, paper-based, or composite bottom (though the methods described herein should not be so limited may be applicable to polymeric, metallic, or other types of bottoms known in the art) which is shaped and/or sealed (e.g., via a heated pressing tool) without causing pin holes, pleats, cuts or cracking of the barrier layer, the closed container and/or bottom. Thus, when solid crisp food products, which can deteriorate when exposed to humidity or oxygen, are sealed within a hermetically closed container that has a lower probability of having pin holes, pleats, cuts or cracking, the probability of product deterioration can be reduced. Accordingly, such hermetically sealed containers may be capable of enclosing a substantially stable environment (i.e., oxygen, humidity and/or pressure) without bulging and/or leaking.

Furthermore, such hermetically sealed containers may be transported worldwide via, for example, shipping, air transport or rail. Thus, the containers may be subjected to varying atmospheric conditions (e.g., caused by variations in temperature, variations in humidity, and variations in altitude). For example, such conditions may cause a significant pressure difference between the interior and the exterior of the hermetically closed container. Moreover, the atmospheric conditions may cycle between relatively high and relatively low values, which may exacerbate existing manufacturing defects. Specifically, the hermetically closed container may be subject to strains that lead to defect growth, i.e., the dimensions of for example, pin holes, pleats, cuts or cracks resulting from the manufacturing process may be increased. The systems and methods for producing hermetically sealed containers, described herein, may provide a container that can be transported and/or stored under widely differing climate conditions (i.e., temperature, humidity and/or pressure) without defect growth.

Moreover, the systems and methods described herein may produce hermetically sealed containers having sufficient rigidity to resist deformation while subjected to varying atmospheric conditions. Specifically, when a hermetically closed container containing a high internal pressure is subjected to ambient conditions at a relatively high altitude (e.g., about 1,524 meters above sea level, about 3,048 meters above sea level, or about 4,572 meters above sea level), the pressure differential between the interior and the exterior of the hermetically closed container may exert a force upon the hermetically closed container (e.g., acting to cause the hermetically closed container to bulge out). Depending upon the shape of the hermetically closed container, any bulging may cause the hermetically closed container to deform, which may lead to unstable behavior on the shelf (e.g., wobbling and rocking) and may negatively influence purchase behavior. In embodiments set forth herein, the hermetically closed containers described herein may be formed from material having sufficient strength, surface friction, and heat stability for rapid manufacturing (i.e., high cycle output machine types and/or manufacturing lines).

As noted, the hermetically sealed containers produced using the systems and methods described herein may include a paper-based composite bottom. Likewise, the container body may comprise a paper-based composite material, allowing the entire container to be recycled in a single stream (opposed to similar containers with metal bottoms, for example). The bottoms and/or container bodies of the invention may comprise any paper known in the art such, as for example, a fiber-based and/or pulpable material, such as cardboard, paperboard, cupboard stock, cupstock, litho paper, or even molded fiber. In some embodiments, the bottoms and/or container bodies of the invention may be 100% paper. In some embodiments, the container assemblies may be about 90% or more paper content by mass. In some embodiments, the container assemblies may be about 95% or more paper content by mass. These paper content percentages may advantageously qualify the container assemblies as mono-material in certain countries, allowing them to be accepted in the recycling streams of most countries globally. In some embodiments, the term "mono-material" includes any material that can be collected and enter a waste management flow to obtain raw material from a residue for a different application. In other embodiments, the bottoms and/or container bodies of the invention may be composite materials.

The Sealing System

Referring to FIGS. 1-11, the containers described herein may be formed using the following sealing systems 100 and/or according to the following methods. In one embodiment, the paper-based bottom may begin as a sheet or disc. While the paper bottom discussed herein is referred to as being round or a disc, the invention should not be so limited. The paper bottom may comprise any shape known in the art and may correlate to the shape of the container. For example, if the container has a square, rectangular, triangular, or irregular cross section, the paper bottom may have a correlated shape (square, rectangular, triangular, or irregular).

For example, a composite sheet or paper-based disc 50 may be shaped to conform to a composite container body 60 via a mandrel assembly 200, a die assembly 300, and a container support assembly (not shown) operating in cooperation. The mandrel assembly 200 may be utilized to stamp or press a paper-based disc 50 to form it into a composite bottom 51 (shown in FIG. 10-11).

The mandrel assembly 200 may include an outer mandrel 210 (sometimes referred to as a "downholder" due to its purpose of holding the disc 50 downwardly, against the die assembly 300) and an inner mandrel 220 (sometimes referred to as a "sealing punch" due to its purpose of punch drawing the disc 50 into a container 60 and sealing the disc 50 against the sidewall of the container 60). The outer mandrel 210 and inner mandrel 220 may each move along the Y-axis independent of one another. The inner mandrel 220 may translate with respect to the outer mandrel 210 to form a paper-based disc 50 into a bottom closure 51. Further, the die assembly 300 may cooperate with the mandrel assembly 200 to shape the paper-based disc 50 into the bottom closure 51, simultaneously or nearly simultaneously inserting the closure 51 into the bottom end 62 of a composite body 60. The die assembly 300 may generally comprise a die 80 having a top surface 97, a positioning portion 90, a die opening 98 and sealing member(s) 40, also known as the die bush ring. The tube assembly may be configured to retain and move the composite body 60, relative to the mandrel assembly 200 and die assembly 300. For example, the tube assembly may move the composite body laterally to align the axis of the container body 60 with the axis of the mandrel assembly 200 and die assembly 300 and/or vertically along the axis of the mandrel assembly 200 and die assembly 300.

In an embodiment, the mandrel assembly 200, the die assembly 300, and the container support assembly may be aligned along the Y-axis, at lease during the methods described herein, such that a paper-based disc 50 may be urged through the die opening 98 by the inner mandrel 220 and inserted into the bottom end 62 of a composite body 60 held by the tube support member.

The Die Assembly

The die assembly 300 may be configured to receive and retain the paper-based disc 50 prior to insertion of the disc 50 through the die opening 98 and into the container body 60. In some embodiments, the disc 50 is received from a separate disc feeding assembly (not shown). In an embodiment, the die assembly 300 may be configured to mate or otherwise align with the feeding assembly. For example, the die 80 may comprise notches, ridges, or other alignment features 302 on its upper end (see FIG. 27) which allow it to mate with, align with, or receive a corresponding mechanical element of the feeding assembly. This allows for proper placement of the disc 50 within the die 80.

More specifically, the die assembly 300 may comprise a die 80 (i.e., die bush ring) having a positioning portion 90 (i.e., collet seat), configured to accept and align a paper-based disc 50 within the die 80 prior to forming the disc 50 into a recessed end 51. The positioning portion 90 may be disposed adjacent the die opening 98 in order to align a paper-based disc 50 with the die opening 98.

The positioning portion 90 may comprise a sloped surface 96 that connects a top surface 97 of the die 80 to a sidewall 94 of the positioning portion 90. The sloped surface 96 may slope downwardly, toward the die opening 98 and axis of the die assembly 300. In an embodiment, the sloped surface 96 may allow the disc 50 to be guided into the positioning portion 90.

The sidewall 94 of the positioning portion 90 may be vertical or substantially vertical, in an embodiment. The sidewall 94 of the positioning portion 90 may be longer than the thickness of the disc 50, in an embodiment. The outer diameter of the sidewall 94 of the positioning portion 90 may be substantially similar to the diameter of the disc 50, in an embodiment. In another embodiment, the outer diameter of the sidewall 94 of the positioning portion 90 may be slightly larger than the diameter of the disc 50.

In an embodiment, the sloped surface 96 of the positioning portion 90 may have a larger perimeter nearest to the top surface 97 of the die 80 and a smaller perimeter nearest to sidewall 94. In some embodiments, the circumference of the outer edge of the sloped surface 96 of the positioning portion 90 may be larger than the paper-based disc 50. The sloped surface 96 may be tapered downwardly to allow gravitational assistance for the alignment of the paper-based disc 50 within the positioning portion 90. Once seated, the paper-based disc 50 may be positioned adjacent the disc support surface 92 and the sidewall 94 of the positioning portion 90. In an embodiment, the disc support surface 92 and the sidewall 94 of the positioning portion 90 connect at a ninety-degree angle or substantially a ninety-degree angle. In an embodiment, the disc support surface 92 may be horizontal or substantially horizontal. In an embodiment, the seated disc 50 is positioned such that its lower surface 54 (see FIG. 2) is adjacent (i.e. seated atop) the disc support surface 92. In an embodiment, the seated disc 50 is positioned such that its thickness is adjacent the sidewall 94 of the positioning portion 90.

In an embodiment, the inner circumference of the disc support surface 92 is smaller than the circumference of the disc 50. In an embodiment, the inner circumference of the disc support surface 92 adjacent the die opening 98. In an embodiment, the disc support surface 92 is disposed adjacent a die opening inner surface 99. The die opening inner surface 99 may be vertical or substantially vertical, in an embodiment. In an embodiment, the disc support surface 92 is disposed at a right angle or a nearly right angle to the die opening inner surface 99.

In use, a disc 50 is inserted into the die assembly 300, positioned within the positioning portion 90, and seated on the disc support surface 92. In an embodiment, vacuum pressure may be applied to the paper-based disc 50, from underneath, to align it within the positioning portion 90 of the die 80.

While the die opening 98 is depicted as having a substantially circular cross-section, the die opening 98 may have a cross-section that is substantially circular, triangular, rectangular, quadrangular, pentagonal, hexagonal or elliptical. In an embodiment, the die opening 98 may be configured to accept the inner mandrel 220, discussed below. In an embodiment, the die opening 98 may have a substantially similar cross-section as that of the inner mandrel 220.

The Mandrel Assembly

As noted above, the mandrel assembly 200 may comprise an inner mandrel 220 and an outer mandrel 210. The inner mandrel 220 and the outer mandrel 210 may be translatable, separately from one another. In an embodiment, the inner mandrel 220 and the outer mandrel 210 translate parallel to one another, which may be vertically but need not be vertically. For example, the system may provide an inner mandrel 220 and outer mandrel 210 that translate horizontally or angularly.

In an embodiment, the inner mandrel 220 may move a first distance and the outer mandrel 210 may move a second distance, wherein the first and second distances are different from one another. Likewise, the inner mandrel 220 may move at a first time and the outer mandrel 210 may move at a second time, wherein the first and second times are different from one another. In an embodiment, the inner mandrel 220 and the outer mandrel 210 may move in unison during a first time period. In an embodiment, the inner mandrel 220 may have a first extension length and the outer mandrel 210 may have a second extension length, wherein the first and second extension lengths are different from one another. In an embodiment, the outer mandrel 210 may move in unison with both the inner mandrel 210 and the ejector 30 until such time as the mandrel assembly 200 contacts the die assembly 300. Each of the outer mandrel 210, the inner mandrel 210 and the ejector 30 may contact the die assembly 300 simultaneously in an embodiment.

The outer mandrel 210 may be generally cylindrical, in an embodiment. In this embodiment, the container may be cylindrical. However, if the container is not cylindrical (i.e. square, triangular, rectangular, irregular, etc. cross-section), the outer mandrel 210 may have a shape and configuration which correlates to that of the container.

Figure 19:
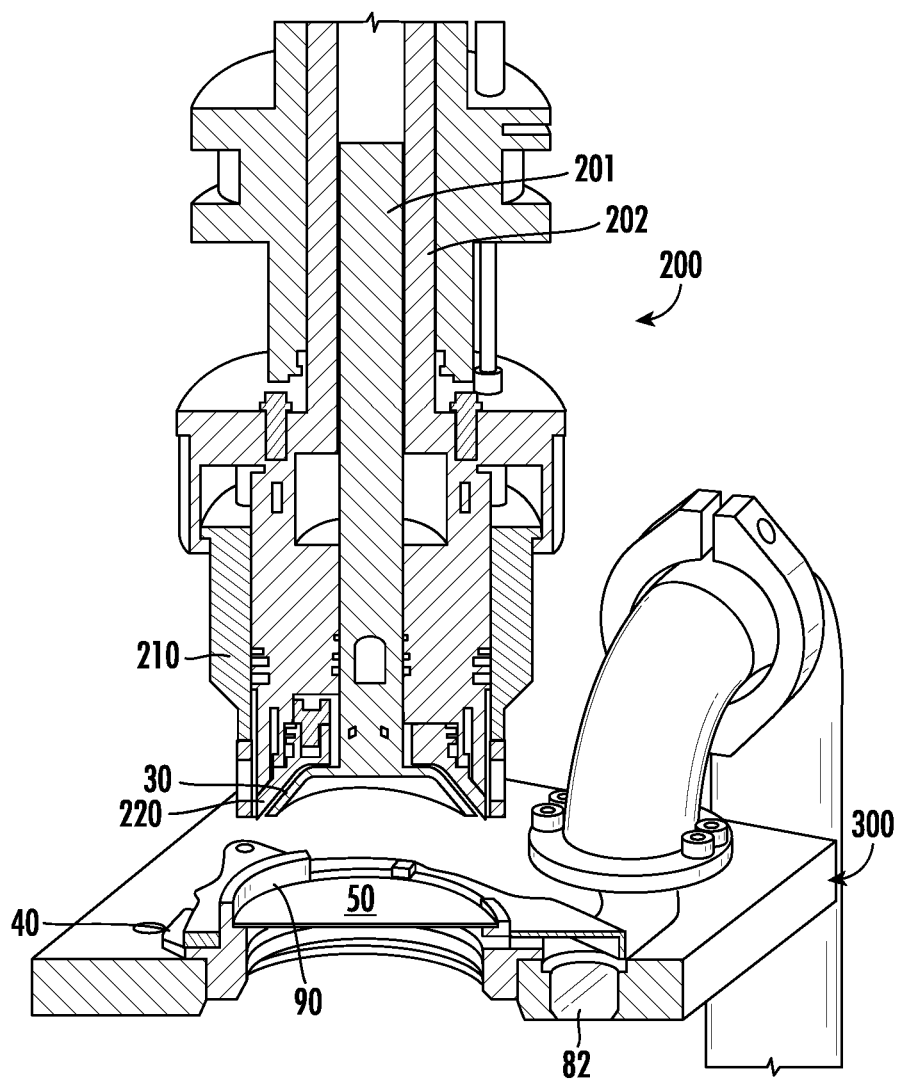
FIGS. 19-26 illustrate exemplary sealing systems in accordance with an embodiment of the invention.

In another embodiment, the outer mandrel 210 may comprise a vertically extending (i.e. downwardly) portion 212 and a radially-outwardly directed flange 214. The flange 214 may not be present in some embodiments (see FIG. 19). The vertically extending portion 212, in an embodiment, may be perforated and/or may have through holes 216 disposed therein. In an embodiment, the vertically extending portion 212 and the radially-outwardly directed flange 214 may join in a right angle or a nearly right angle.

In an embodiment, the vertically extending portion 212 of the outer mandrel 210 may be sized to fit within the circumference of the positioning portion 90. In an embodiment, the vertically extending portion 212 of the outer mandrel 210 has a greater circumference than that of the die opening 98, such that the vertically extending portion 212 of the outer mandrel 210 cannot extend into the die opening. More specifically, the vertically extending portion 212 of the outer mandrel 210 may be sized and/or configured such that, when fully extended, it is disposed adjacent the positioning portion sidewall 94 and the disc support surface 92 of the positioning portion 90. In an embodiment, the vertically extending portion 212 of the outer mandrel 210 may be extended after the disc 50 is seated within the positioning portion 90 and may be configured to secure the disc 50 in place (see FIG. 4).

Figure 12:
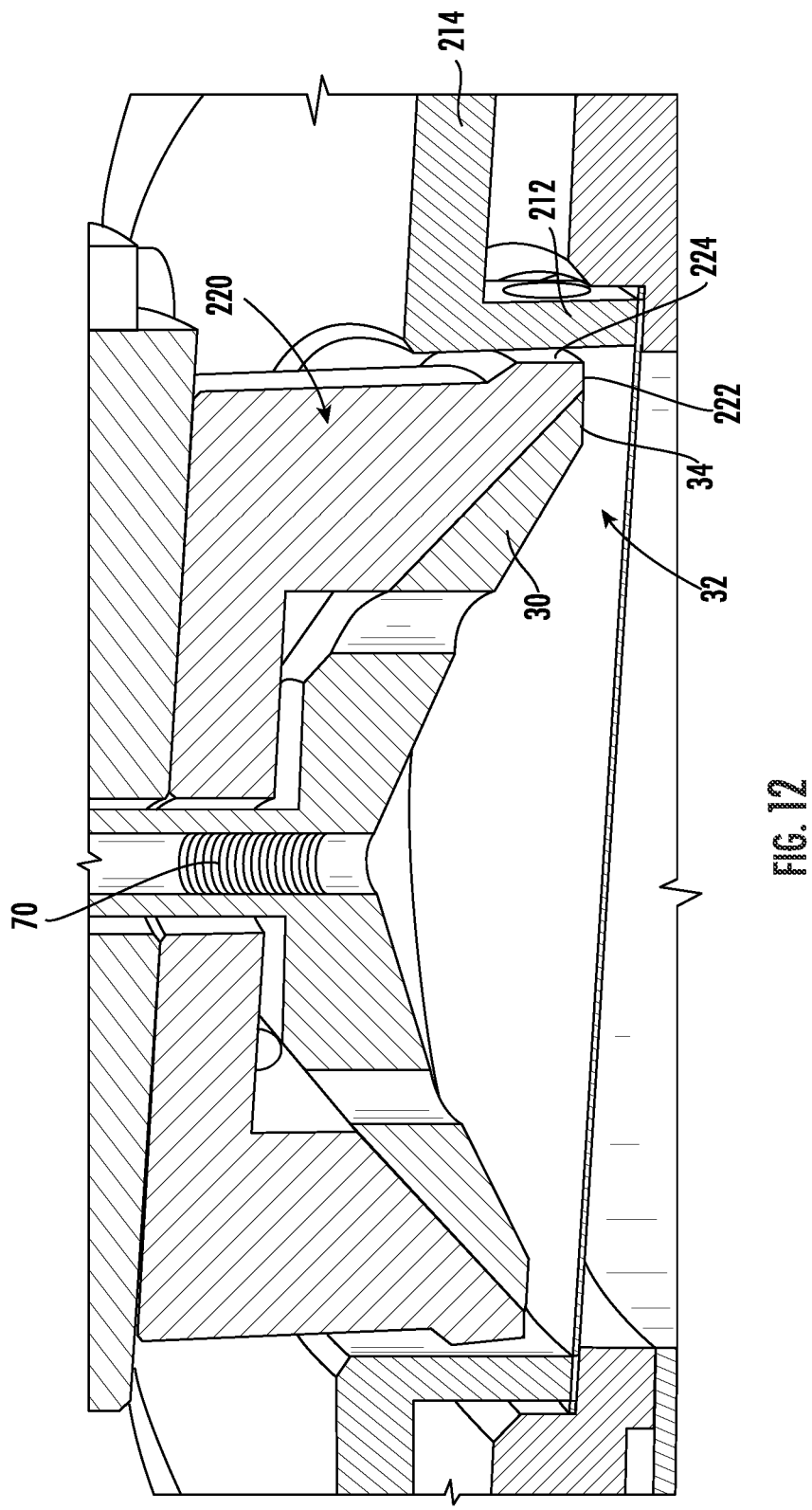
FIG. 12 illustrates an exemplary sealing system in accordance with an embodiment of the invention.

As shown in FIG. 12, the inner mandrel 220 may be generally cylindrical. As noted above with regard to the outer mandrel, the inner mandrel 220 may be shaped and configured to correlate to the shape and configuration of the container. For example, if a container has a square-cross section, the inner mandrel 220 may have a square shape and configuration.

In an embodiment, the inner mandrel 220 may be sized to fit within the inner circumference of the vertically extending portion 212 of the outer mandrel 210. In an embodiment, the inner mandrel 220 may be configured to extend vertically lower than the vertically extending portion 212 of the outer mandrel 210. In this embodiment, once the disc 50 is seated within the positioning portion 90 and constrained by the fully extended vertically extending portion 212 of the outer mandrel 210, the inner mandrel 220 may continue to move vertically downwardly, extending beyond the base of the vertically extending portion 212 of the outer mandrel 210, and pushing/urging the disc 50 into the open end 62 of the container 60 (see FIG. 6).

The inner mandrel 220 may comprise a first mandrel surface 222 adjacent a second mandrel surface 224, together configured to insert and shape a paper-based disc 50 (see FIG. 12). In an embodiment, the first mandrel surface 222 may join the second mandrel surface 224 in an angle of between about 92° and about 94°. In an embodiment, the first mandrel surface 222 may be horizontal or substantially horizontal and may be disposed adjacent the top surface of the disc 50 when fully extended. In an embodiment, the second mandrel surface 224 may be vertical or substantially vertical and may be configured to be adjacent an inner surface of the vertically extending portion 212 of the outer mandrel 210 as the inner mandrel 220 passes through the outer mandrel 210. That is, the circumference of the second mandrel surface 224 may be less than the inner circumference of the vertically extending portion 212 of the outer mandrel 210. In an embodiment, the second mandrel surface 224 is parallel to the inner surface of the vertically extending portion 212 of the outer mandrel 210.

It is noted that while the first mandrel surface 222 and the second mandrel surface 224 are depicted in the figures as being substantially flat (horizontal and vertical), the first mandrel surface 222 and the second mandrel surface 224 may be curved, contoured or shaped. The inner mandrel 220 may further comprise a shaped portion that is disposed between the first mandrel surface 222 and the second mandrel surface 224. The shaped portion may be curved, chamfered, or comprise any other contour. It is noted that, while the inner mandrel 220 is depicted as having a substantially circular cross-section, the inner mandrel 220 may have a cross-section that is substantially circular, triangular, rectangular, quadrangular, pentagonal, hexagonal or elliptical.

As the inner mandrel 220 pushes the disc 50 into the container 60 (see FIGS. 5-6), the disc is released from between the outer mandrel 210 and the positioning portion 90 of the die assembly 300. The central portion 56 of the disc 50 may be pushed downwardly, through the die opening 98, into the open end 62 of the container 60, such that the central portion 56 (the first deformed surface 53) remains flat or substantially flat (i.e. horizontal). During insertion of the disc 50 into the container 60, in an embodiment, the peripheral portion 58 of the disc 50 may be bent at a right angle or a near-right angle, shown as the second deformed surface 55 in FIG. 11. In this embodiment, the peripheral portion 58 of the disc 50 (becoming the second deformed surface 55) may be forced adjacent the second mandrel surface 224, passing through the die opening 98. The resulting second deformed surface 55 (previously the peripheral portion 58) of the disc 50 may be disposed vertically or nearly vertically, adjacent the inner sidewall 66 of the container 60, at the open end 62.

The disc 50 may be pushed into the container 60 any distance that would be practical in the art. In an embodiment, the disc 50 becomes a recessed composite bottom 51 (FIG.

11). In an embodiment, the peripheral edge 57 of the disc 50 is flush with the edge of the sidewall of the container 60. In another embodiment, the peripheral edge 57 of the disc 50 is disposed inward, in relation to the container 60, of the edge of the sidewall of the container 60. In an embodiment, the first deformed surface 53 and the second deformed surface 55 are joined in a right angle or a near-right angle, within the container body 60.

In an embodiment, a mandrel heater may be configured to heat the first mandrel surface 222 and/or the second mandrel surface 224 of the inner mandrel 220, in an embodiment. In an embodiment, the mandrel heater may be disposed within the inner mandrel 220. The inner mandrel 220 may, in an embodiment, further comprise an insulated portion formed from a heat insulating material that is configured to mitigate heat transfer.

The Sealing Members

The sealing member(s) 40 may be configured to provide heat and pressure for heat sealing. The sealing member(s) 40 may be positionable between a sealing position (FIGS. 1-6) and an open position (FIGS. 7-11). When in the sealing position, sealing member(s) 40 are in contact with the outer surface 64 of the container 60 and when in the open position, the sealing member(s) 40 are not in contact with the container 60. In an embodiment, the sealing member(s) 40 comprise segmented clamping brackets (see figures generally).

Figure 14:
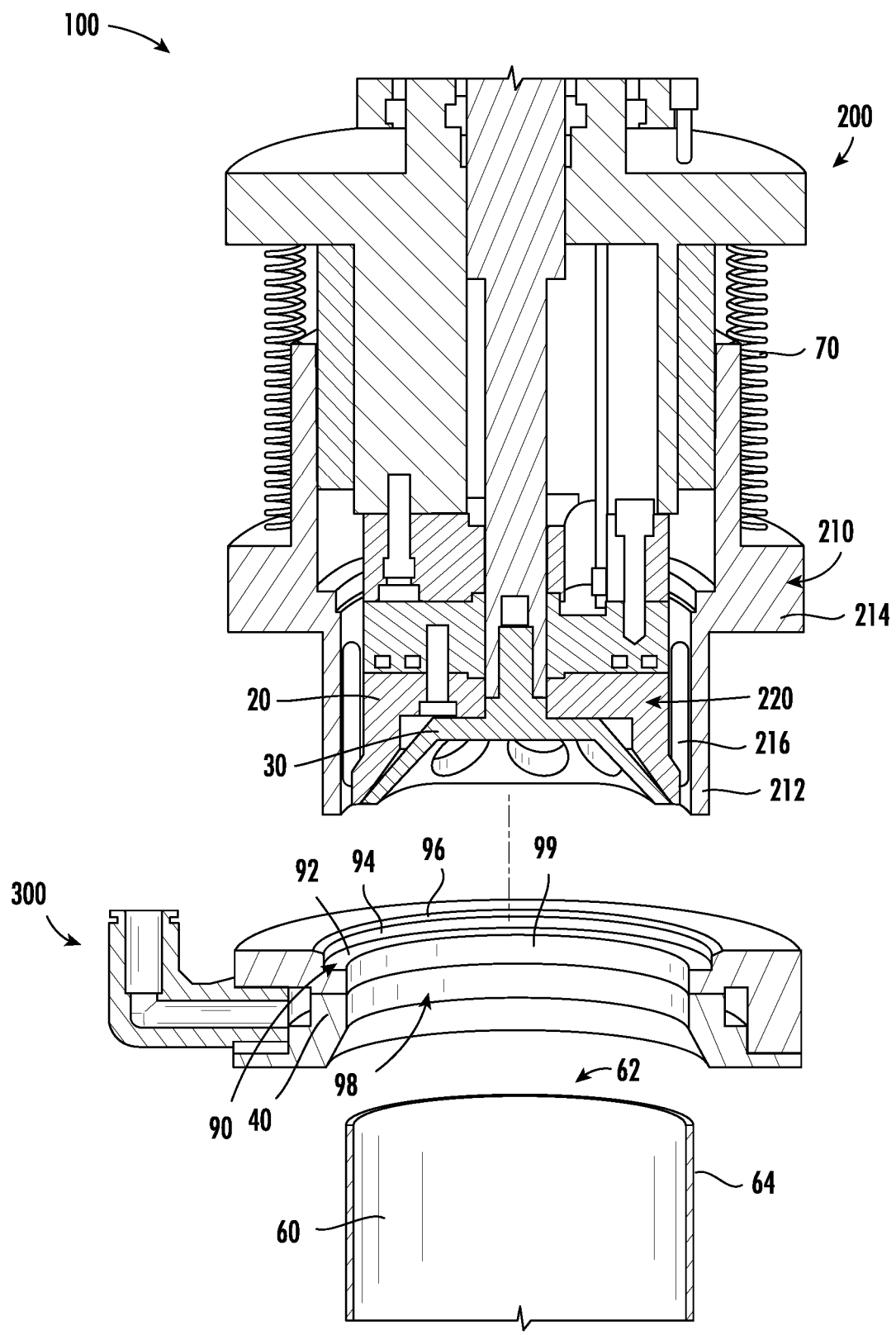
FIG. 14 illustrates an exemplary sealing system in accordance with an embodiment of the invention.
Figure 15:
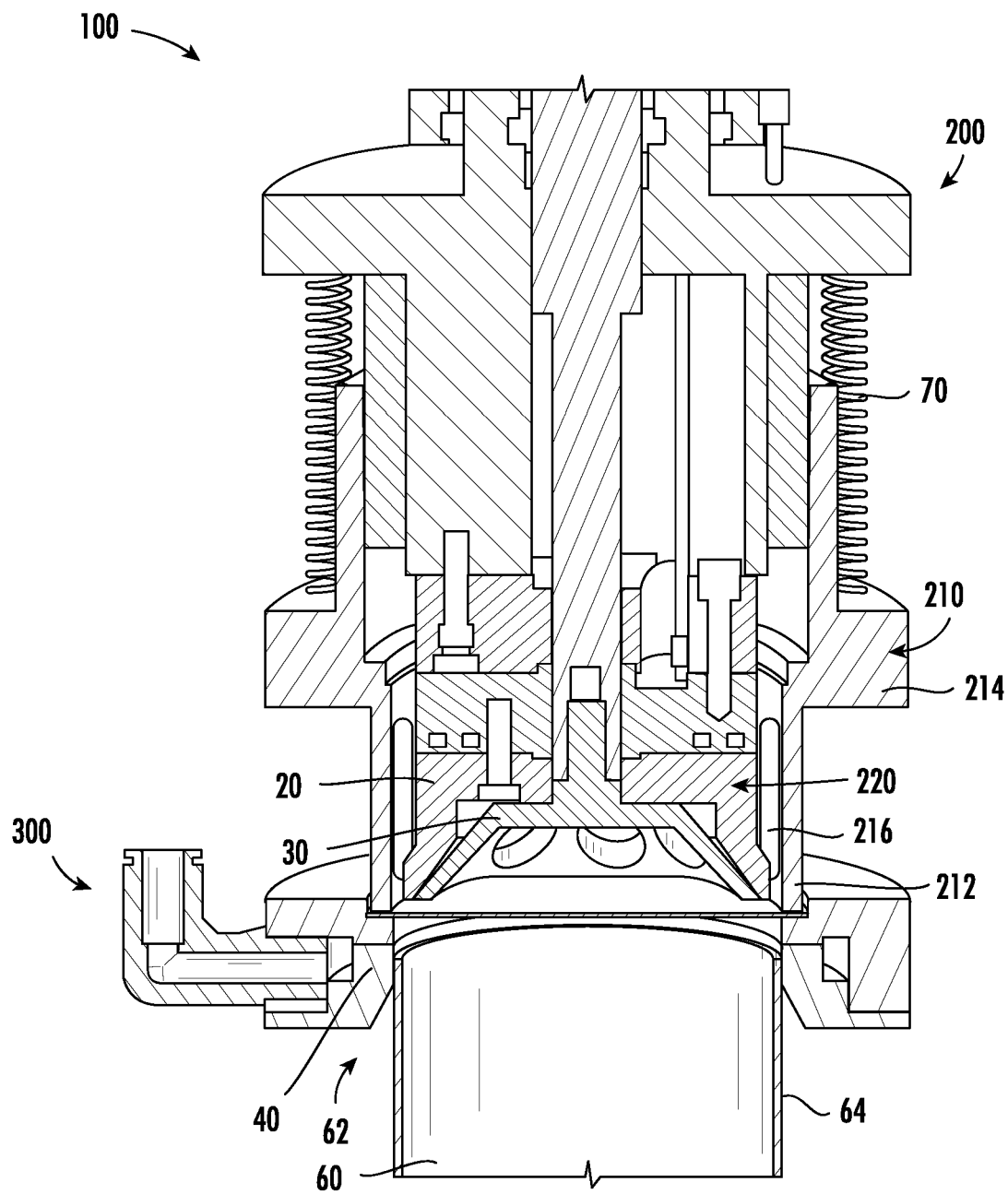
FIG. 15 illustrates an exemplary sealing system in accordance with an embodiment of the invention.
Figure 16:
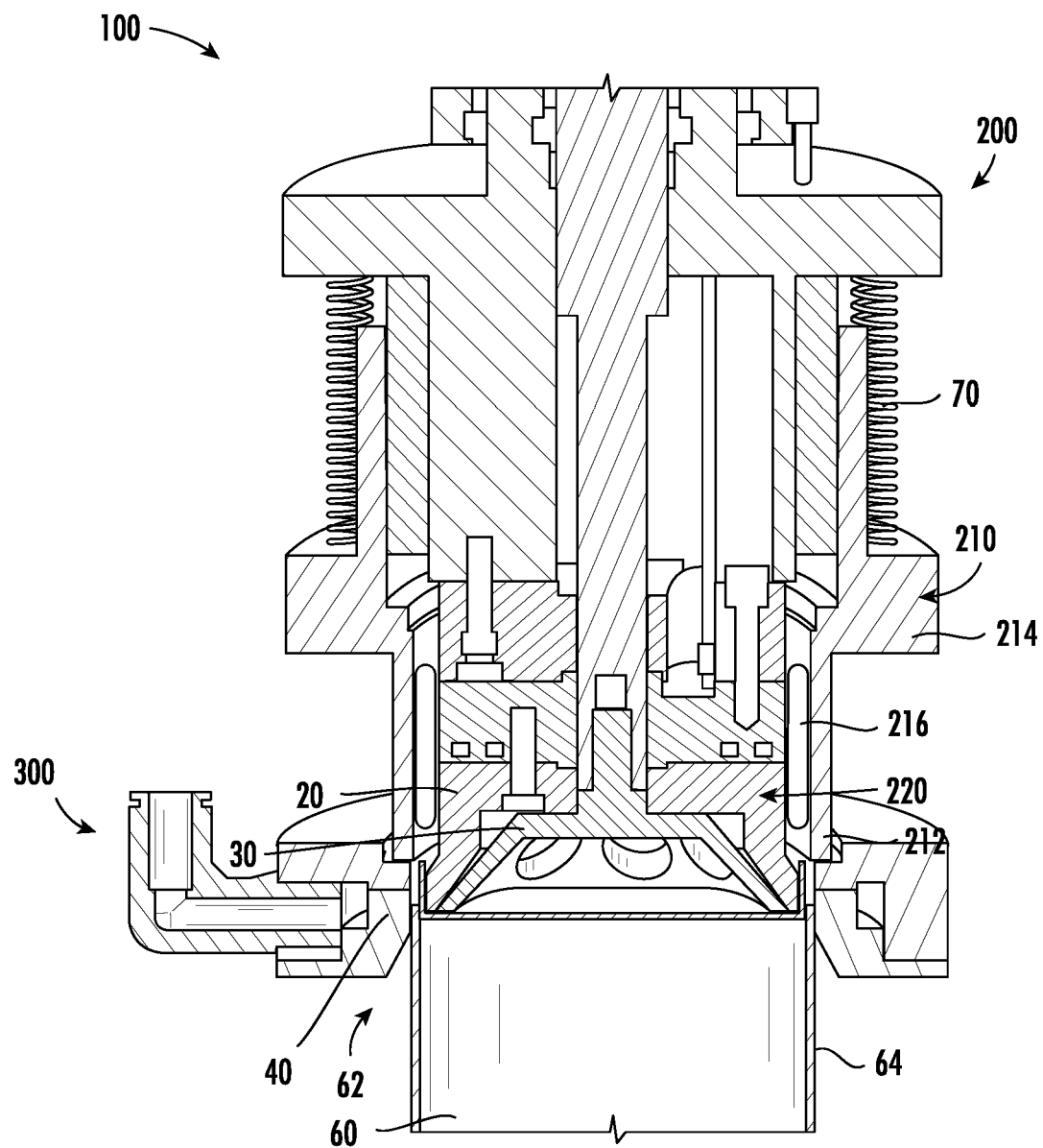
FIG. 16 illustrates an exemplary sealing system in accordance with an embodiment of the invention.
Figure 17:
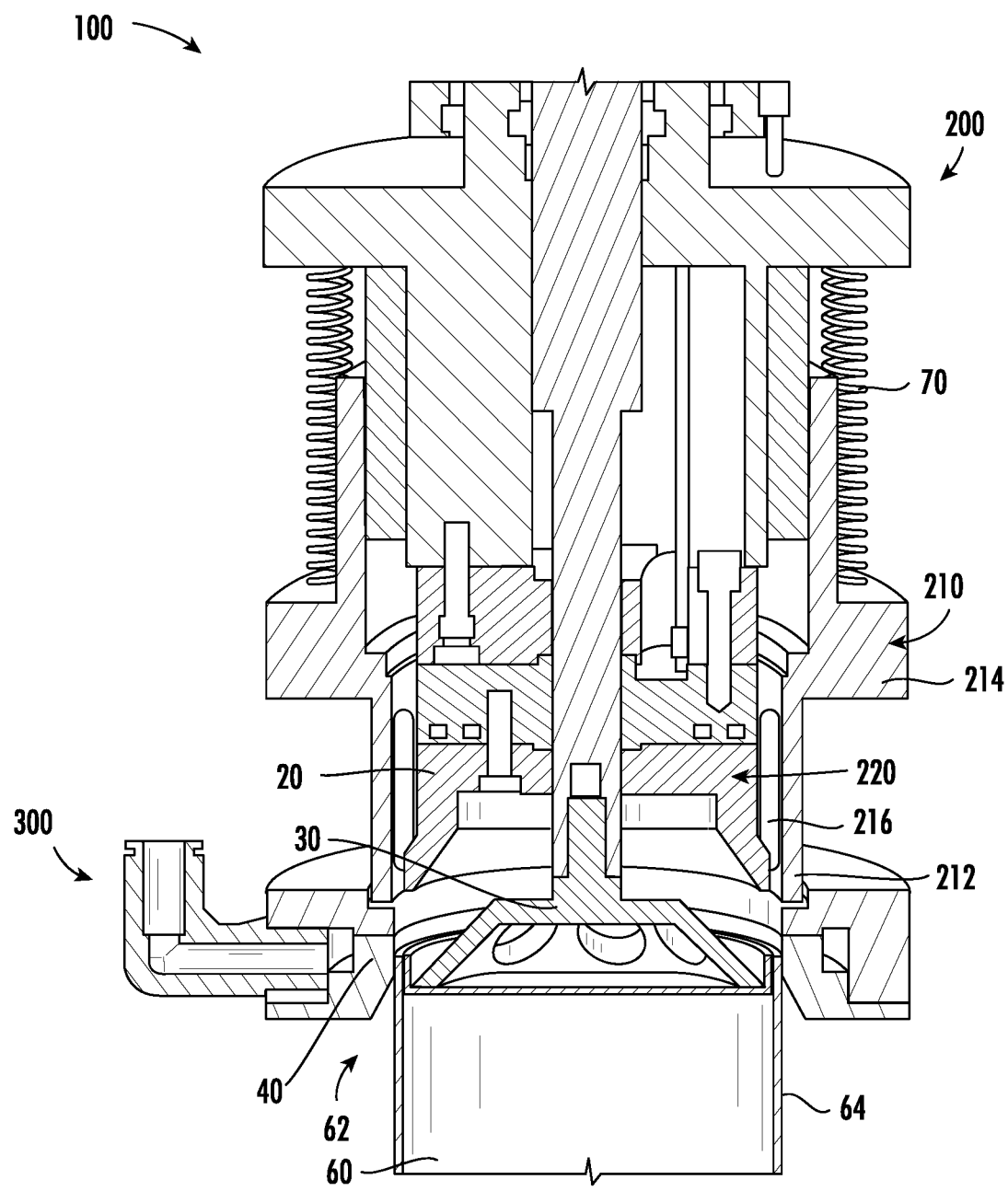
FIG. 17 illustrates an exemplary sealing system in accordance with an embodiment of the invention.
Figure 18:
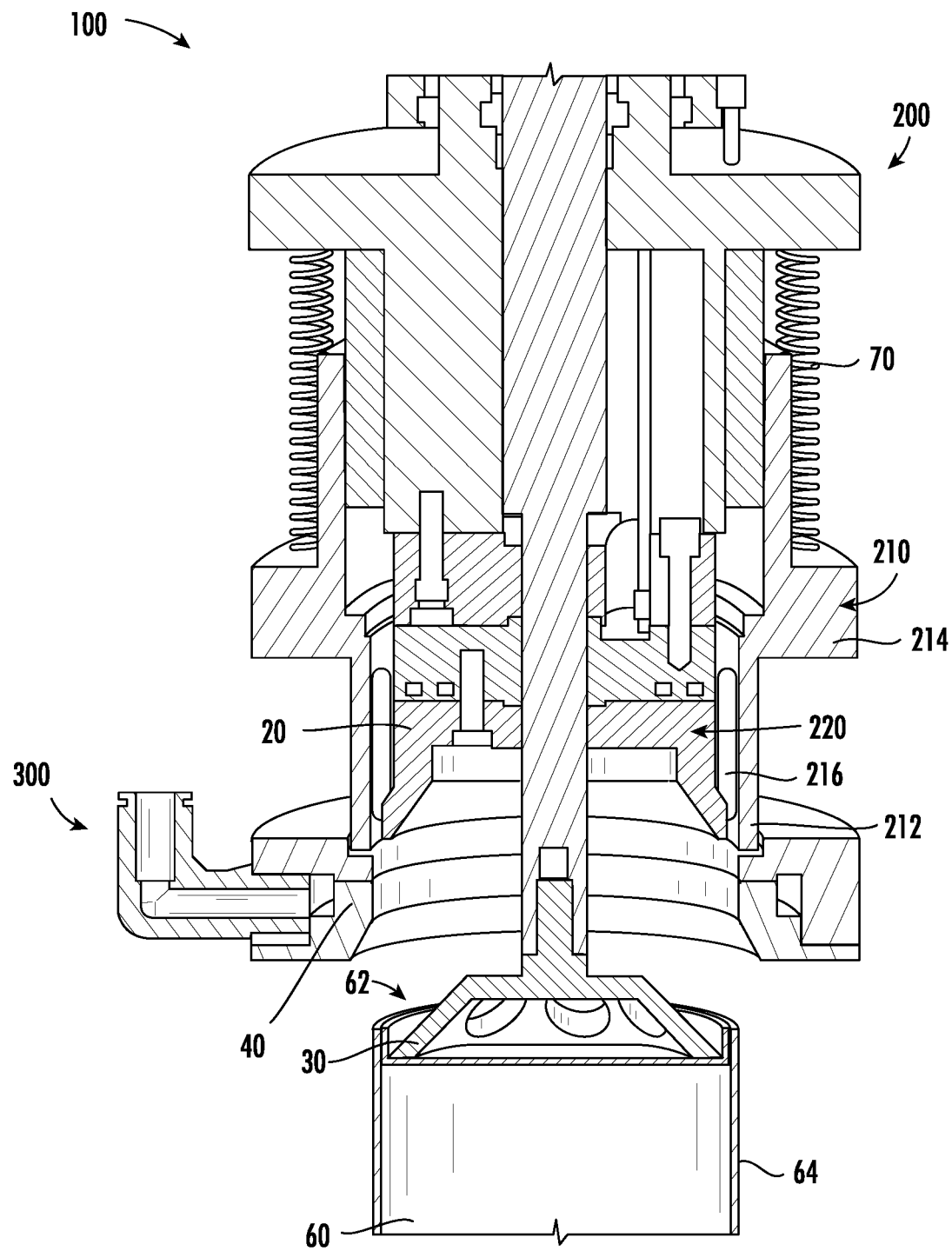
FIG. 18 illustrates an exemplary sealing system in accordance with an embodiment of the invention.

In other embodiments, the sealing member comprises a non-segmented clamping ring (see FIGS. 14-18). FIG. 14 illustrates the inventive system with a non-segmented clamping ring, wherein the system is in its initial state. In FIG. 15, the system moves into position with a disc clamped in place. In FIG. 16, the system moves into the sealing position. FIG. 17 illustrates the removal of the sealing punch while the ejector supports the paper bottom in place. Finally, FIG. 18 illustrates the ejector moving away from the container. In this embodiment, the sealing member may comprise a static die bush ring. This type of sealing member may be particularly useful in ready-to-eat food processing equipment, which has a high focus on food safety.

In an embodiment, for example a segmented clamping bracket embodiment, the sealing member(s) 40 may be rotatably coupled to the die assembly 300. The sealing member(s) 40 may be complimentarily shaped to one another such that, when the sealing member(s) 40 are in the sealing position, the sealing members substantially surround the work piece in a puzzle-like manner. In other embodiments, the sealing member 40 may comprise a single, unitary member (i.e. a closed ring) which surrounds the container body 60 when the container is in position. When sealing a paper-based disc 50 to a composite body 60, the sealing member(s) 40 may compress the bottom end 62 of the composite body 10 along a substantially complete perimeter of the exterior surface 64. When the composite body 60 has a substantially circular cross-section, a circumference of the composite body 60 may be compressed substantially evenly by the sealing member(s) 40. In an embodiment, three sealing member(s) 40 are present. In other embodiments, one sealing member 40 is present (i.e. a non-segmented clamping ring). It is noted that any number of sealing member(s) 40 may be utilized, however. For example, the sealing system may comprise from about one to about ten sealing member(s) 40. Moreover, the sealing member(s) 40 may each cover substantially equal segments of the composite body or may cover substantially non-equal segments.

The sealing member(s) 40 may be utilized to compress and heat a container body in order to perform a heat-sealing operation. Each sealing member 40 may provide conductive heating to a container body of up to about 300° C. Moreover, the sealing member(s) 40 may apply a pressure of up to about 30 MPa to a container body. The sealing member(s) 40 may be adjacent to one another.

As the sealing member(s) 40 contact the exterior surface 64 of the container body 60, the container body 60 and the composite closure 51 may be compressed between the second mandrel surface 224 and the sealing member(s) 40. After compression and heat has been applied for a sufficient dwell time, the sealing member(s) 40 may be moved away from the bottom end 62 of the container body 60 such that the sealing member(s) 40 are not in contact with the container body 60 (FIG. 7) after the dwell time expires.

Ejector

Once the sealing process is complete, in an embodiment, the mandrel assembly 200 is removed from the container body 60. In an embodiment, the outer mandrel 210 releases and is translated away from the die assembly 300 prior to movement of the inner mandrel 220. In other embodiments, the outer mandrel 210 and inner mandrel 220 simultaneously release and translate away from the die assembly 300.

In an embodiment, an ejector 30 is disposed interior of the inner mandrel 220 to aid in the removal of the mandrel assembly 200 from the container 60. The ejector 30 may be spring-loaded, in an embodiment. In other embodiments, the ejector 30 may not be spring loaded. In some embodiments, the inner mandrel 220 may or may not be spring loaded. In a further embodiment, the outer mandrel 210 may or may not be spring loaded. In a particular embodiment, only the outer mandrel 210 is spring loaded.

Figure 20:
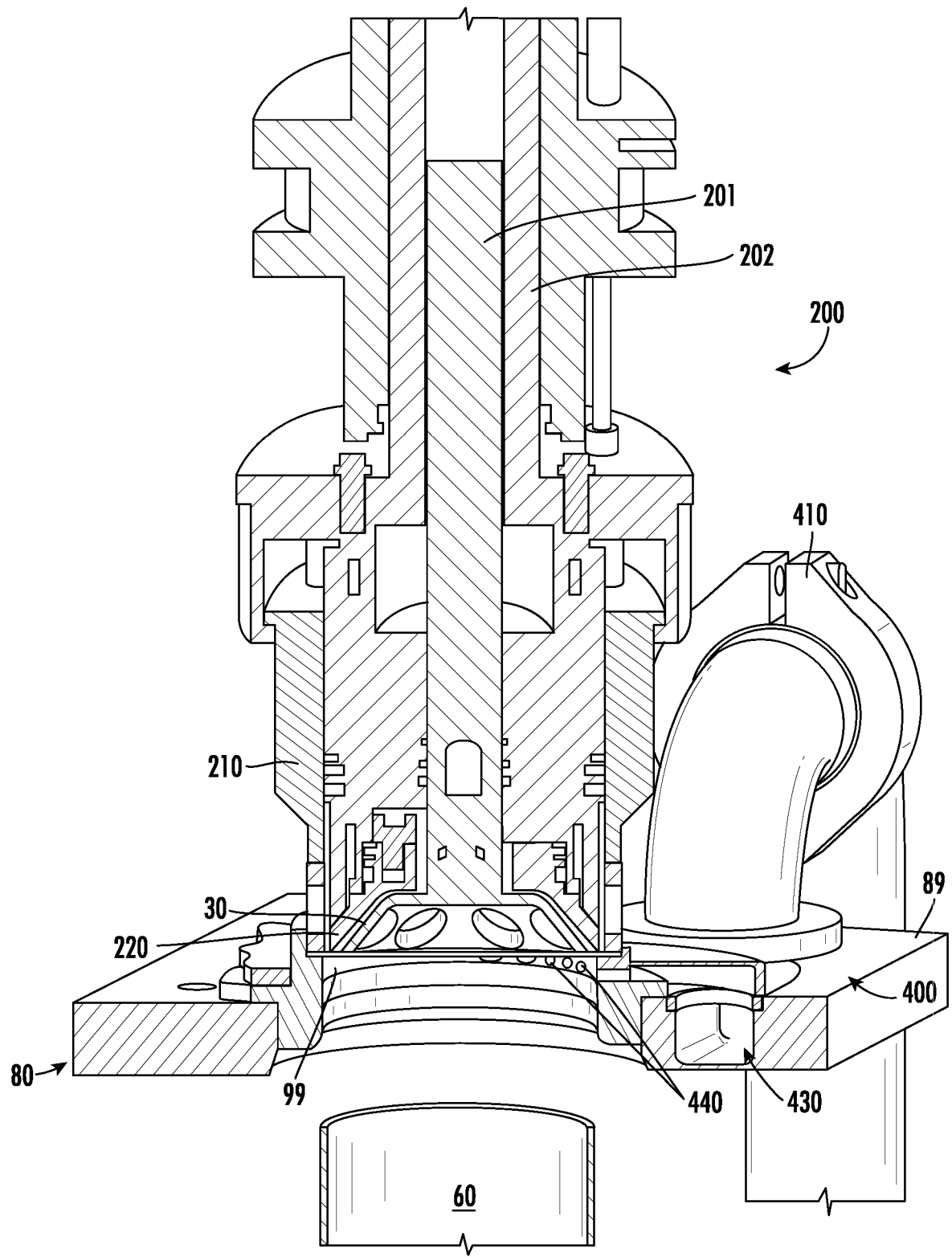
Figure 21:
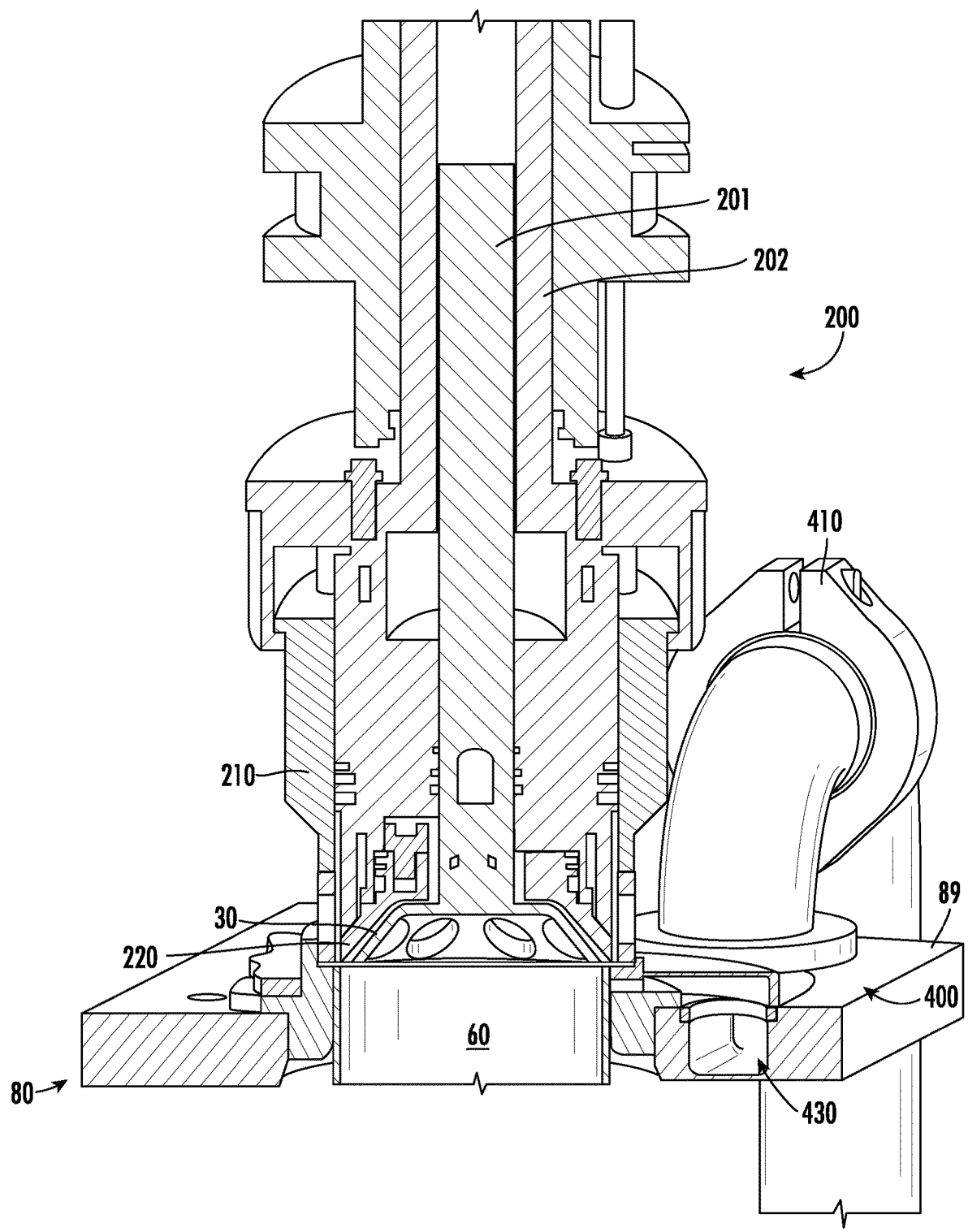
Figure 22:
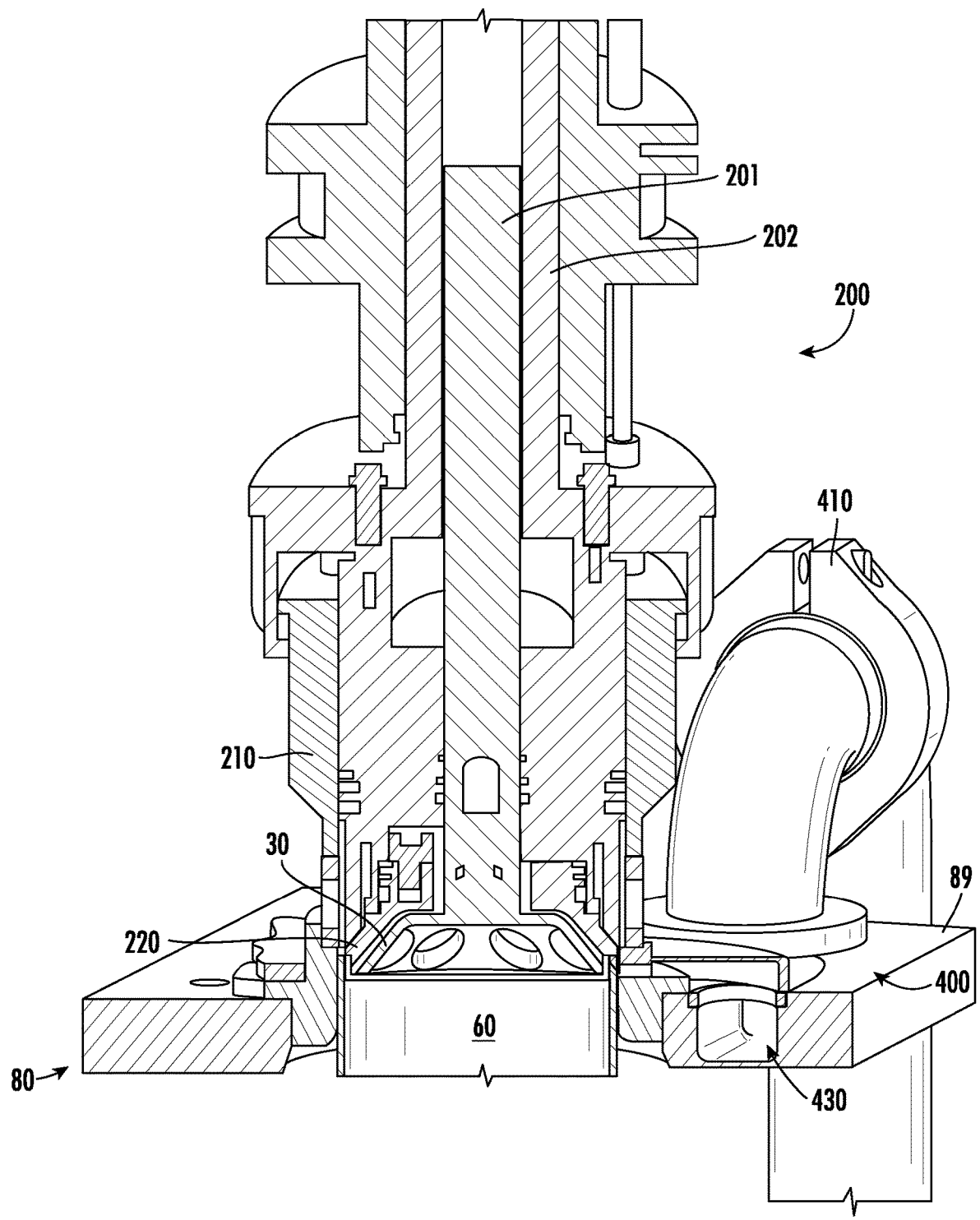
Figure 23:
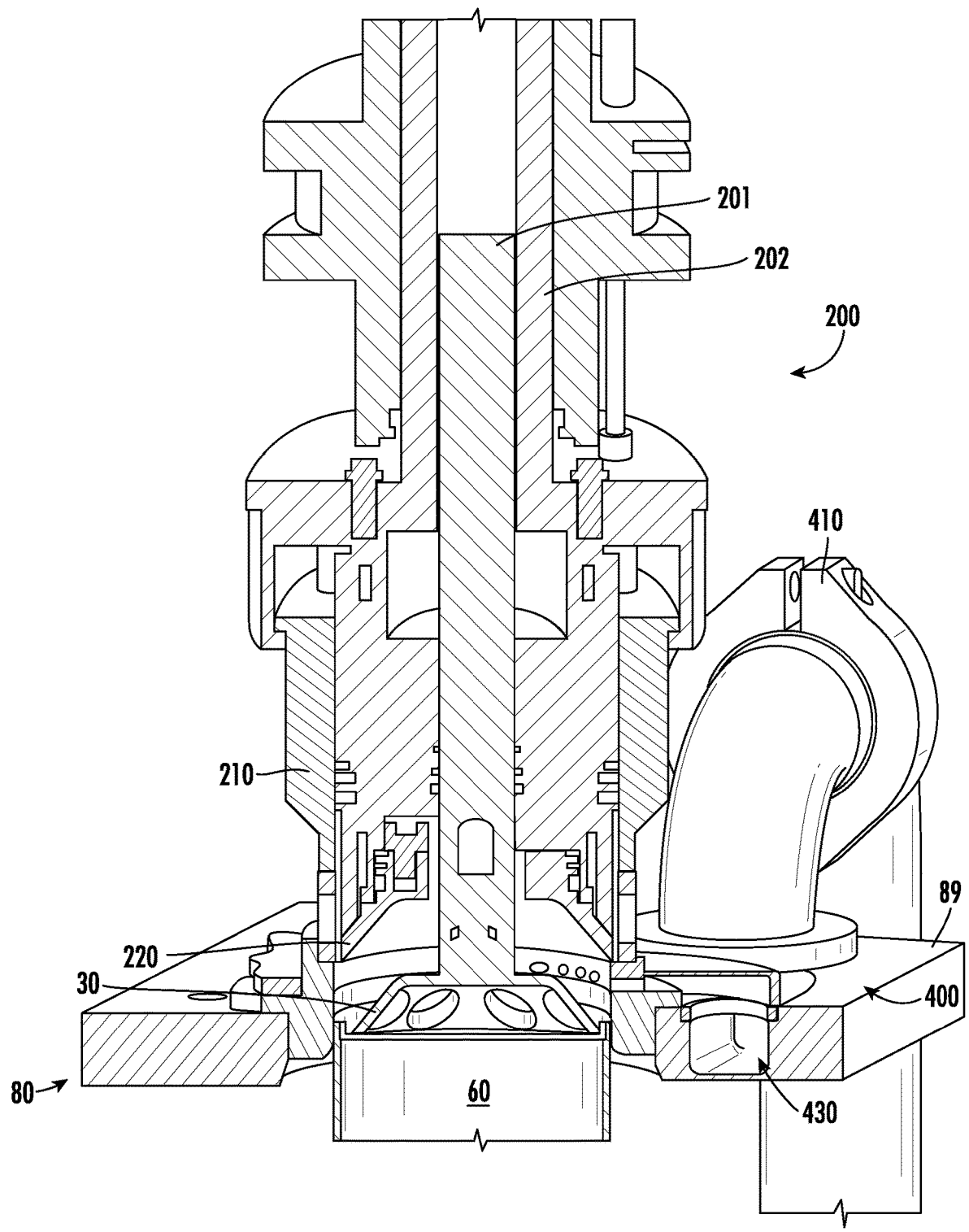
Figure 24:
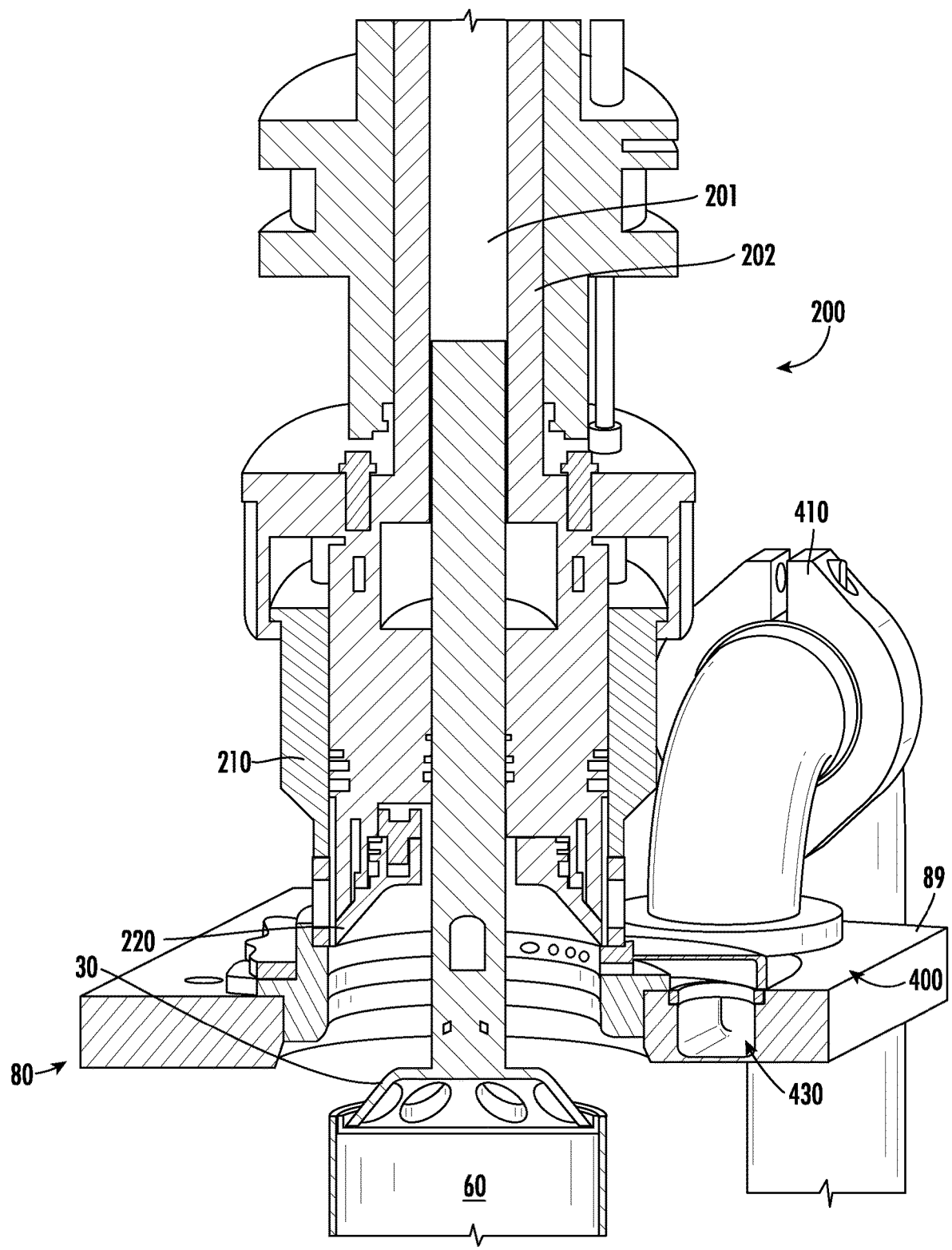
Figure 25:
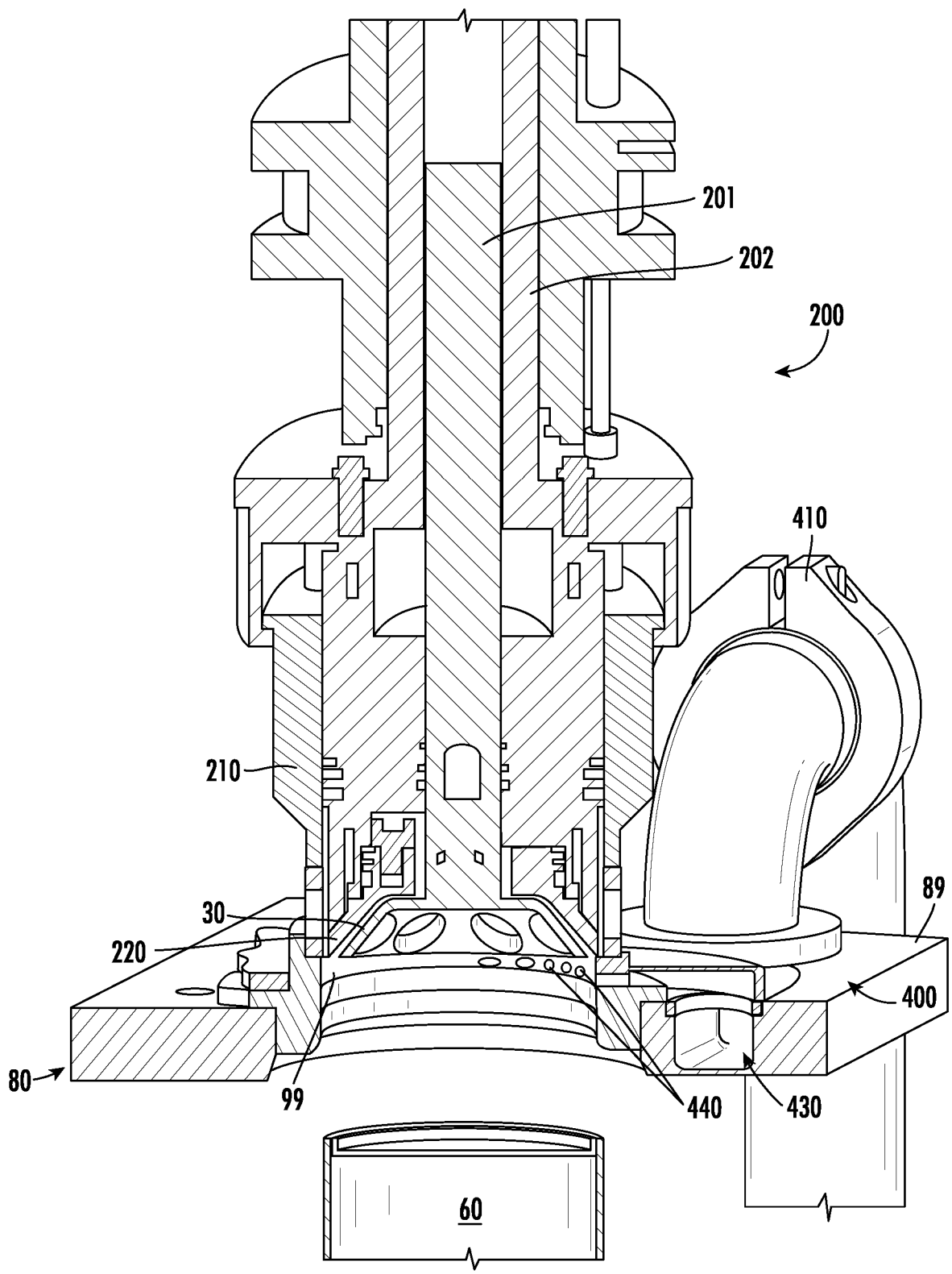
Figure 26:
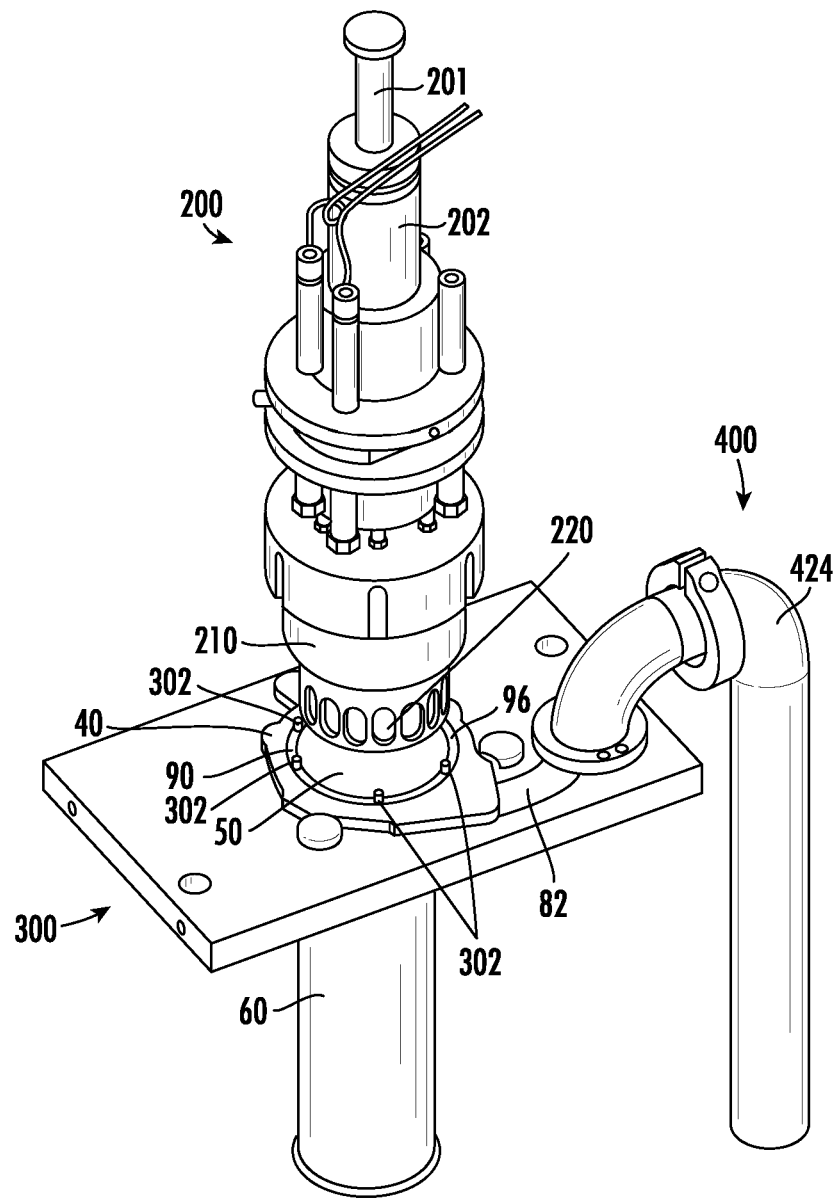
Figure 27A:
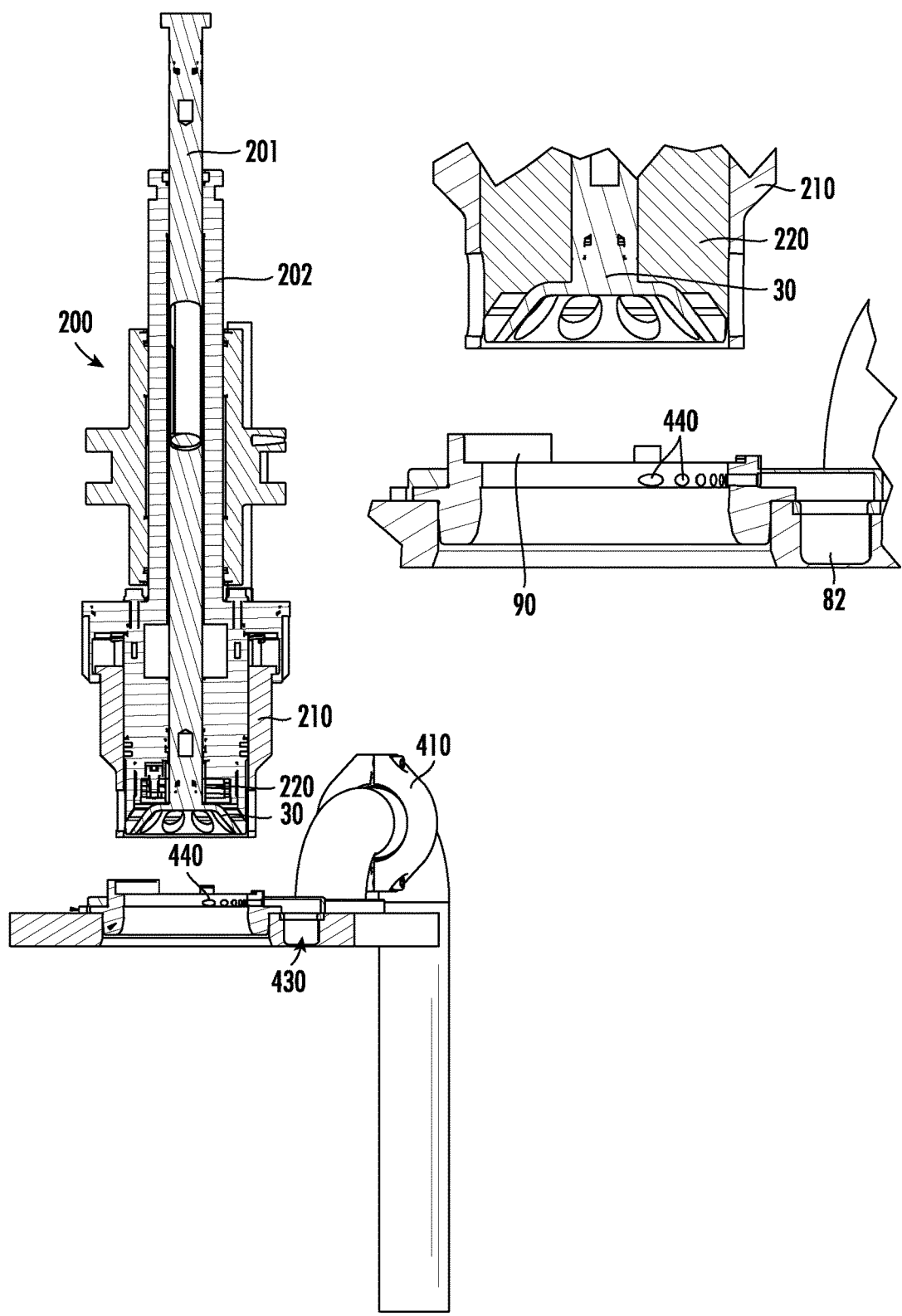
FIG. 27A illustrates a top-front-side view of an exemplary container body, top closure, and paper-based disc, in accordance with some embodiments of the present disclosure.
Figure 27B:
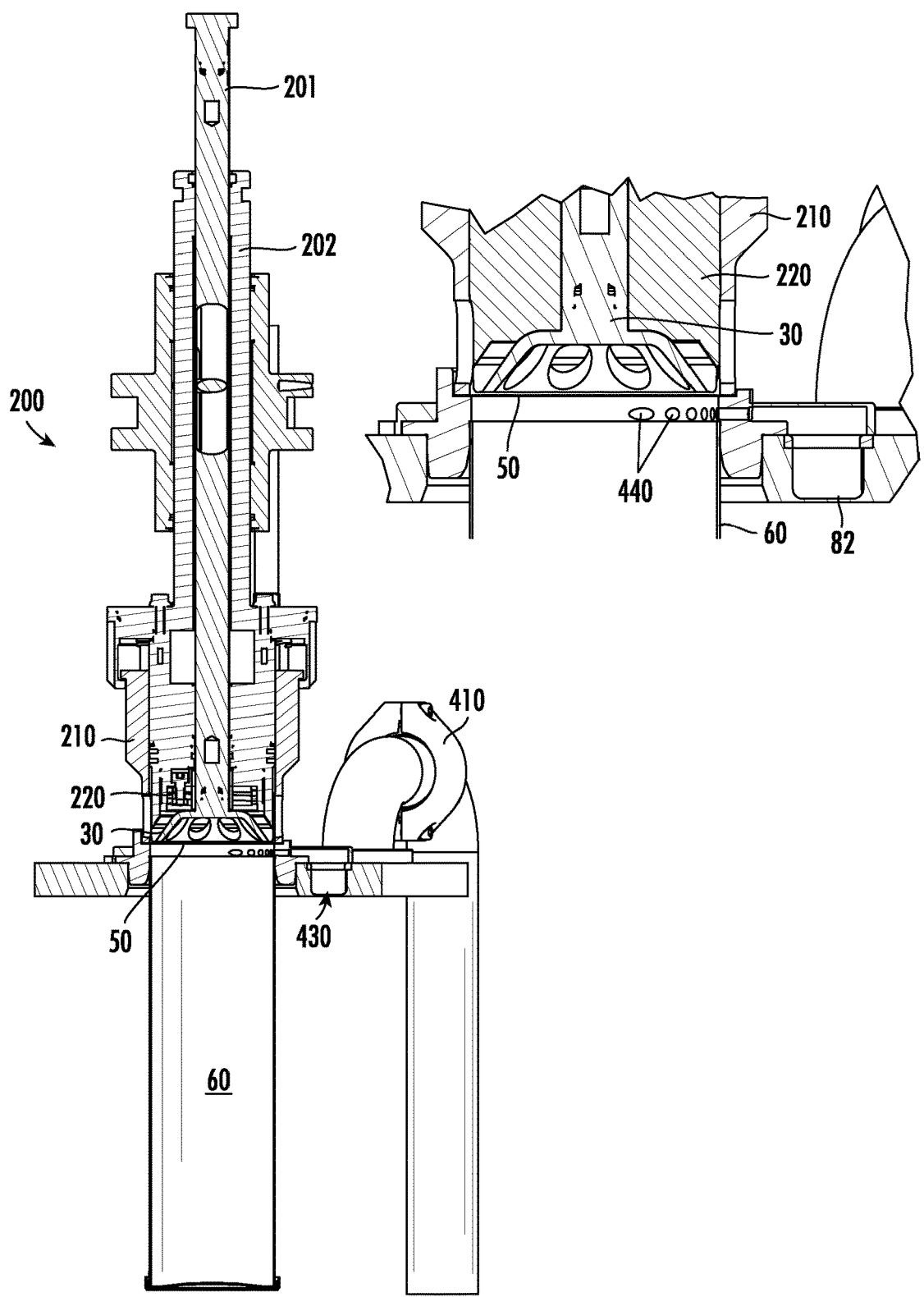
FIGS. 27B-27E are cross-sectional views of the exemplary container body, top closure, and paper-based disc of FIG. 27A, in accordance with some embodiments of the present disclosure.
Figure 27C:
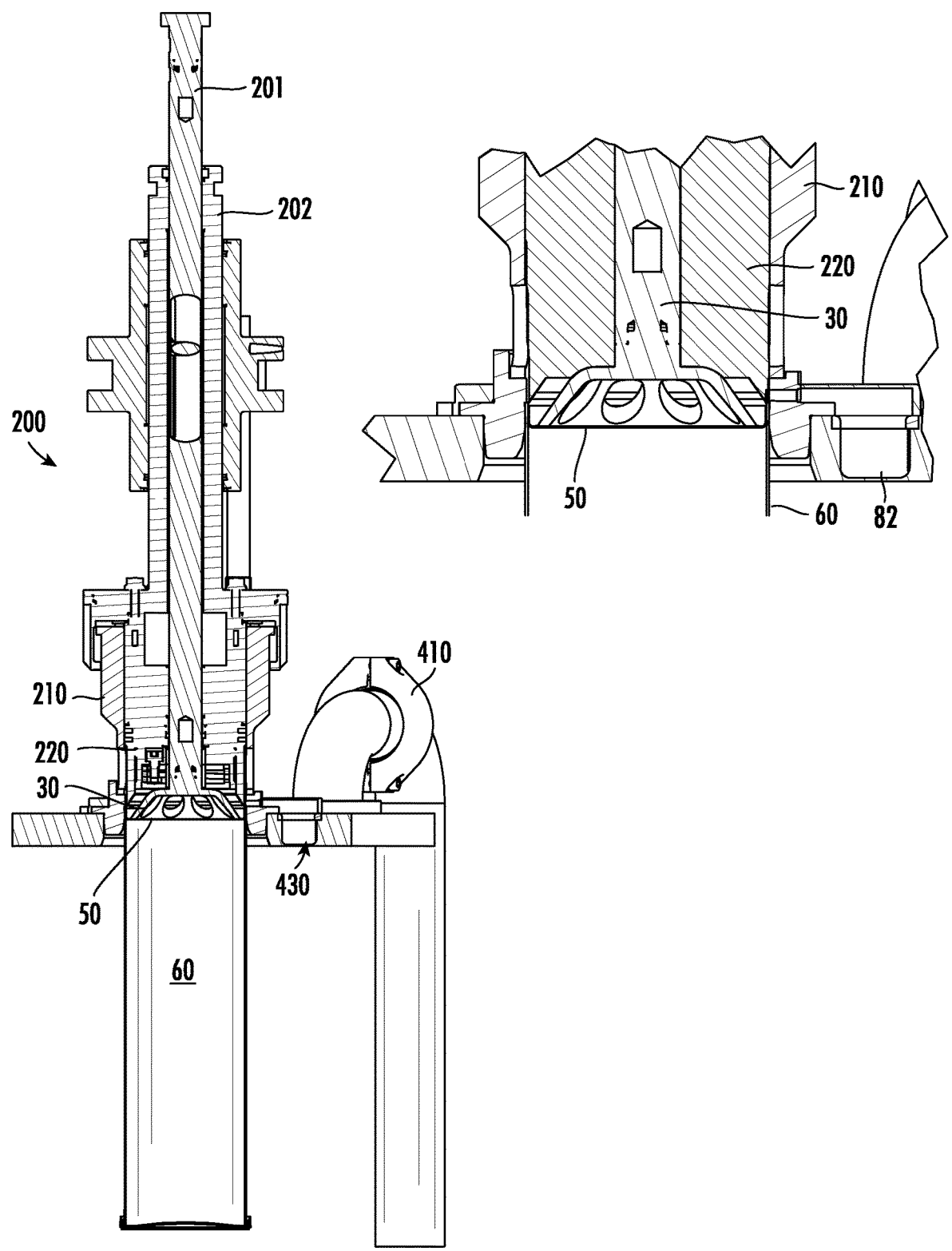
Figure 27D:
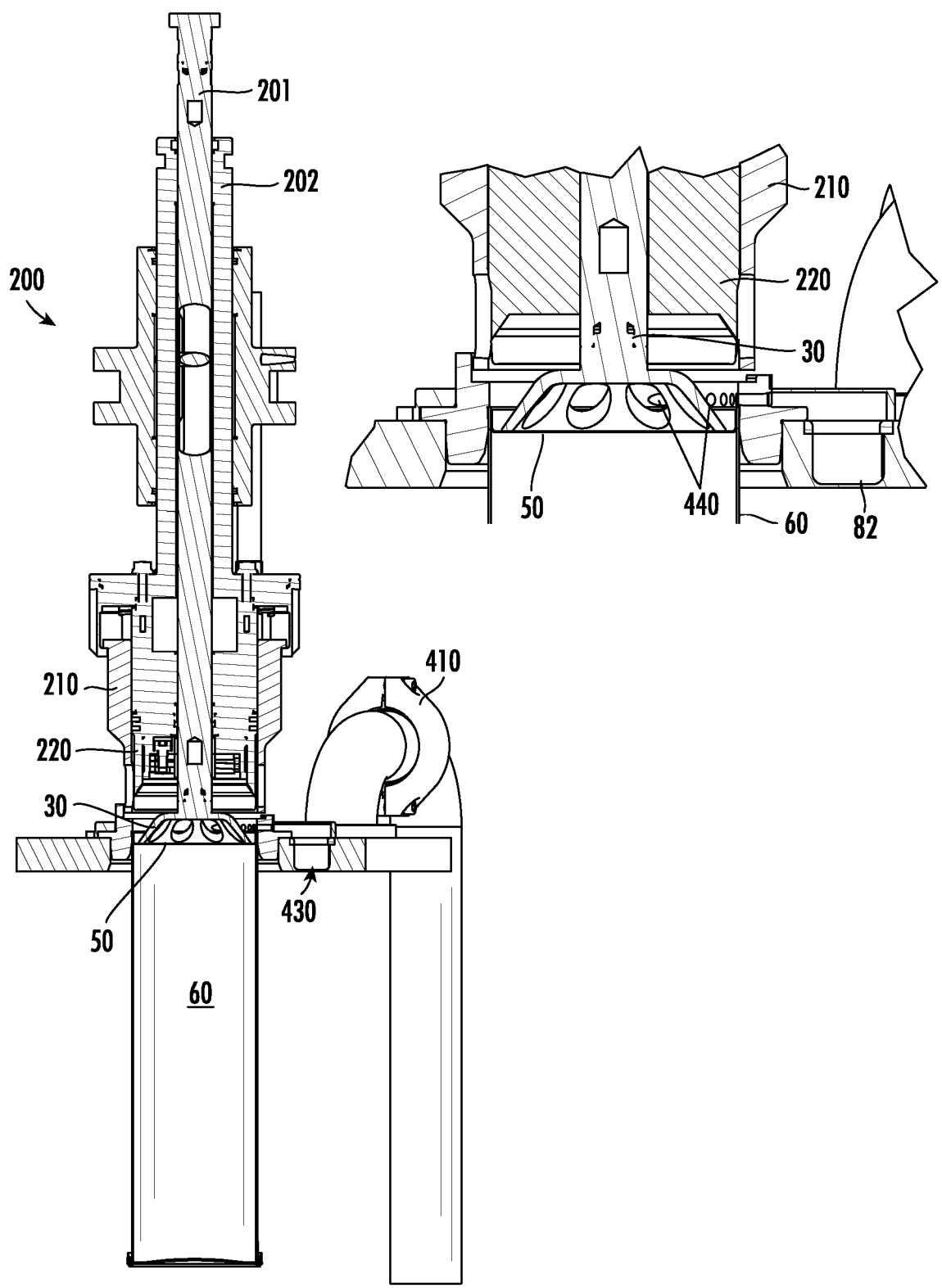
Figure 27E:
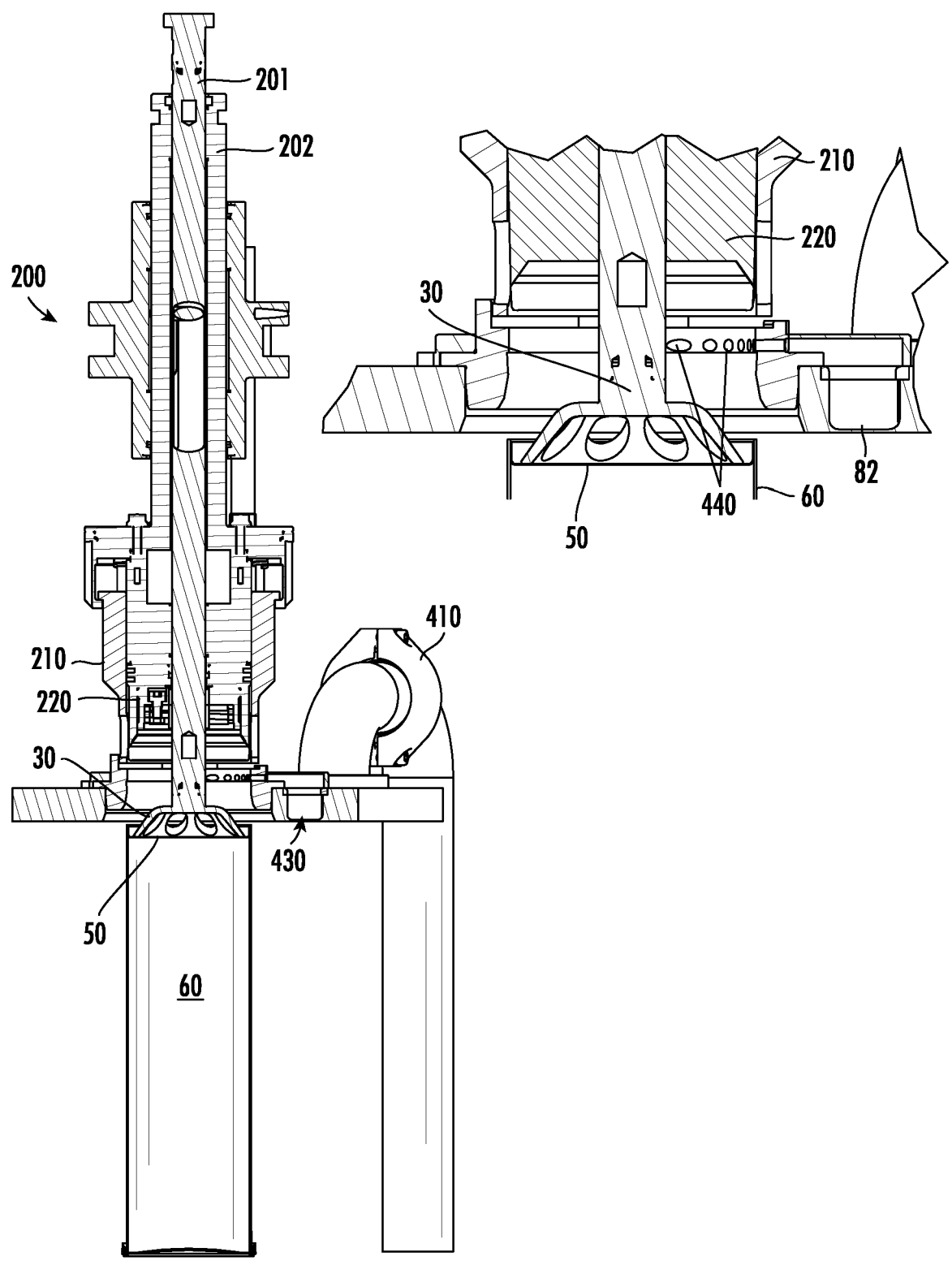

The ejector 30 may have a circumference on its lower end 32 which is less than the circumference of the inner mandrel 220. In this respect, the ejector 30 may be fitted within the inner circumference of the inner mandrel 220 in its retracted position (shown in FIG. 12, for example). In an embodiment, the base of the ejector 30 may comprise a cylindrical pyramid. In such an embodiment, the interior of the inner mandrel 220 may comprise a recess which is cylindrically pyramidal, such that the ejector 30 can be fitted into the inner mandrel 220. In an embodiment, the ejector 30 may be perforated and/or may have through holes disposed therein, as shown in FIGS. 20 and 28.

In another embodiment, the base of the ejector 30 may comprise a plurality of disc contact sections, each contacting the bottom closure 51, but separated from one another. For example, the ejector may comprise three or four prongs that are flattened at the contact surface with the closure 51, to avoid damage to the closure 51.

Figure 13:
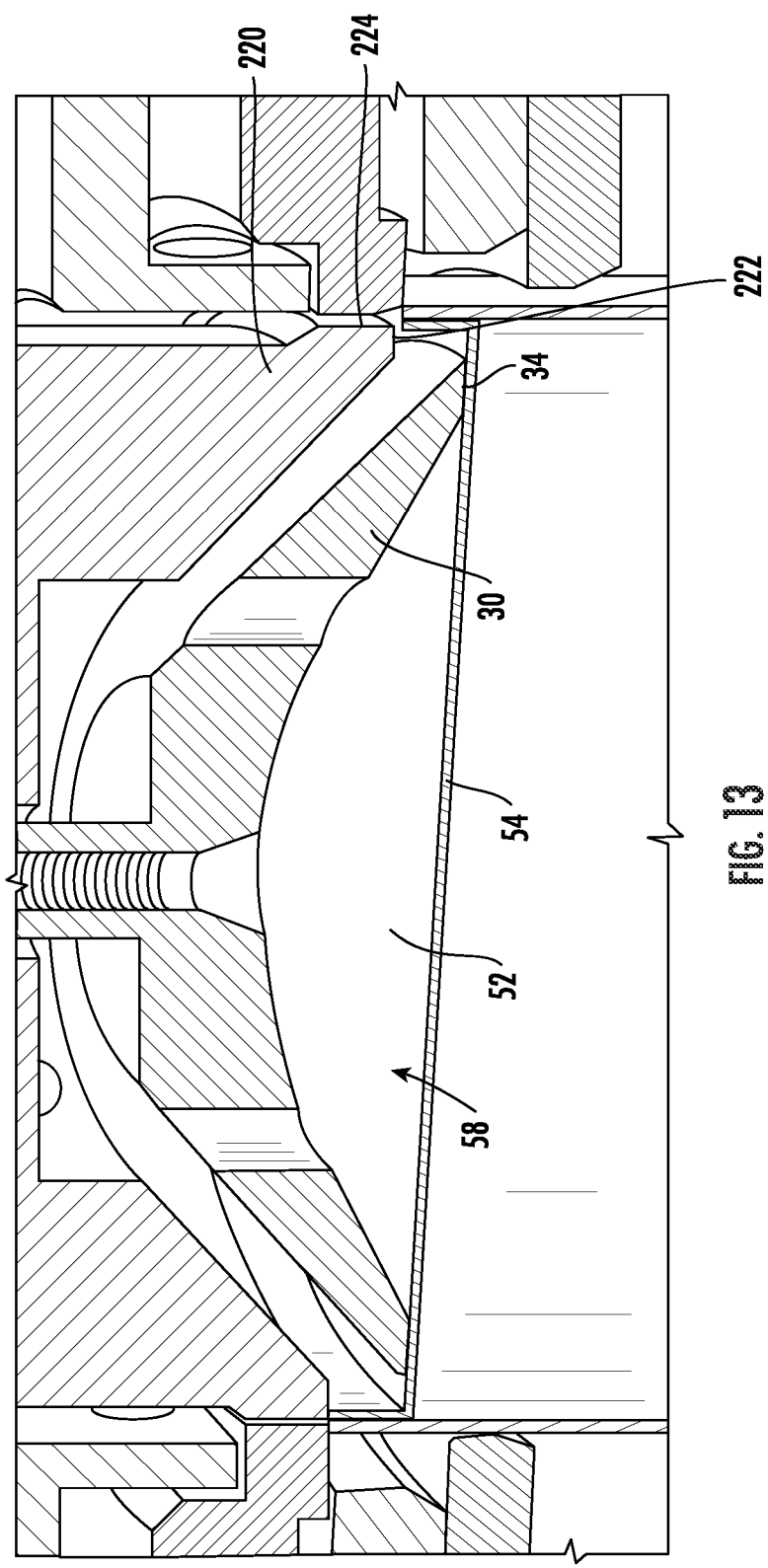
FIG. 13 illustrates an exemplary sealing system in accordance with an embodiment of the invention.

In an embodiment, the ejector has a bottom surface 34 designed to contact the bottom closure 51. The ejector 30 may be solid across its bottom surface 34, from one side of the diameter to the other side of the diameter, in an embodiment. In another embodiment, the ejector 30 may have a hollow interior portion, as shown in the figures. In this embodiment, the bottom contact surface 34 may be circular in cross-section. In any embodiment, the bottom surface 34 of the ejector 30 may contact at least a portion of the first deformed surface 53 of the composite closure 51. In an embodiment, the first deformed surface 53 of the closure 51 may comprise a countersink portion of the closure 51. In a particular embodiment, the bottom surface 34 of the ejector 30 is circumferential and positioned near the second deformed surface 55 of the composite closure 51 when in its extended position (shown in FIG. 13, for example).

In one embodiment, the bottom surface 34 of the ejector 30 may be flush with the first (lower) surface 222 of the inner mandrel 220 when the ejector 30 is in its recessed position (shown, for example in FIG. 12). In another embodiment, the ejector 30 may be recessed slightly within the inner mandrel 220 such that the bottom surface 34 of the ejector 30 is higher than the first (lower) surface 222 of the inner mandrel 220 when the ejector is in its recessed position.

In an embodiment, the ejector 30 and the inner mandrel 220 (and/or outer mandrel 210) may each translate in a parallel manner, optionally vertically, but separately from one another. That is, the inner mandrel 220 may move a first distance and the ejector 30 may move a second distance, wherein the first and second distances are different from one another. Likewise, the inner mandrel 220 may move at a first time and the ejector 30 may move at a second time, wherein the first and second times are different from one another. In an embodiment, the inner mandrel 220 and the ejector 30 may move in unison during a first time period. In an embodiment, the inner mandrel 220 may have a first extension length and the ejector 30 may have a second extension length, wherein the first and second extension lengths are different from one another.

In a particular embodiment, the inner mandrel 220 (and/or outer mandrel 210) is initially vertically retracted from the container 60, while the ejector 30 remains positioned adjacent the composite closure 51 (shown in FIGS. 8 and 13), retaining the position of the paper-based closure 51 within the container 60. In this embodiment, a space may be disposed between the outer circumference of the lower end 32 of the ejector 30 and the deformed portion 55 of the closure 51. This position (FIGS. 8 and 13) may be referred to as the extended position of the ejector 30. In this embodiment, once the inner mandrel 220 is retracted beyond the peripheral edge of the container 60, in an embodiment, the ejector 30 is then retracted vertically upward, back into the interior of the inner mandrel 220.

In another embodiment (see FIG. 28E), after the sealing process is complete, the ejector 30 may extend further downwardly than it extended during the sealing process in order to aid in removal of the container 60 from the die assembly 300. That is, the ejector 30 may push the container 60 downwardly via pressure on the closure 51. Alternatively, the ejector 30 may not add pressure to the closure 51, but may translate downwardly with the container 60 and closure 51, in concern with the movement of the container assembly. In this embodiment, the ejector 30 may then retract from contact with the closure 51 and retract into the mandrel assembly 200.

In an embodiment, the ejector 30 comprises a means for delivering a controlled blast of air directed toward the closure 51 concurrent with or just before retraction of the ejector 30 from the closure 51. In an embodiment, the delivery of pressurized air may comprise a shower head mechanism disposed within the ejector 30. In an embodiment, the mandrel assembly 200 comprises an ejector coupling 201 and a mandrel or sealing head coupling 202 (see FIG. 19).

The ejector 30 of the invention avoids the issue caused by a standard mandrel retraction process. That is, a standard mandrel retraction involves dragging the mandrel out of the container (or vice versa), causing friction between the mandrel and the paper-based closure. As the mandrel and the container are separated, any relative movement of the paper-based closure can cause folds, wrinkles, and/or bubbles to form in the seal, reducing or destroying the hermeticity of the container. The ejector 30 of the present invention allows stabilization of the position of the paper-based closure within the container body during the process of removing the mandrel (i.e. during outfeed). The ejector 30 helps to ensure the hermeticity of the seal between the closure 51 and the container 60, over the complete cycle of the paper bottom sealing process.

Figure 10:
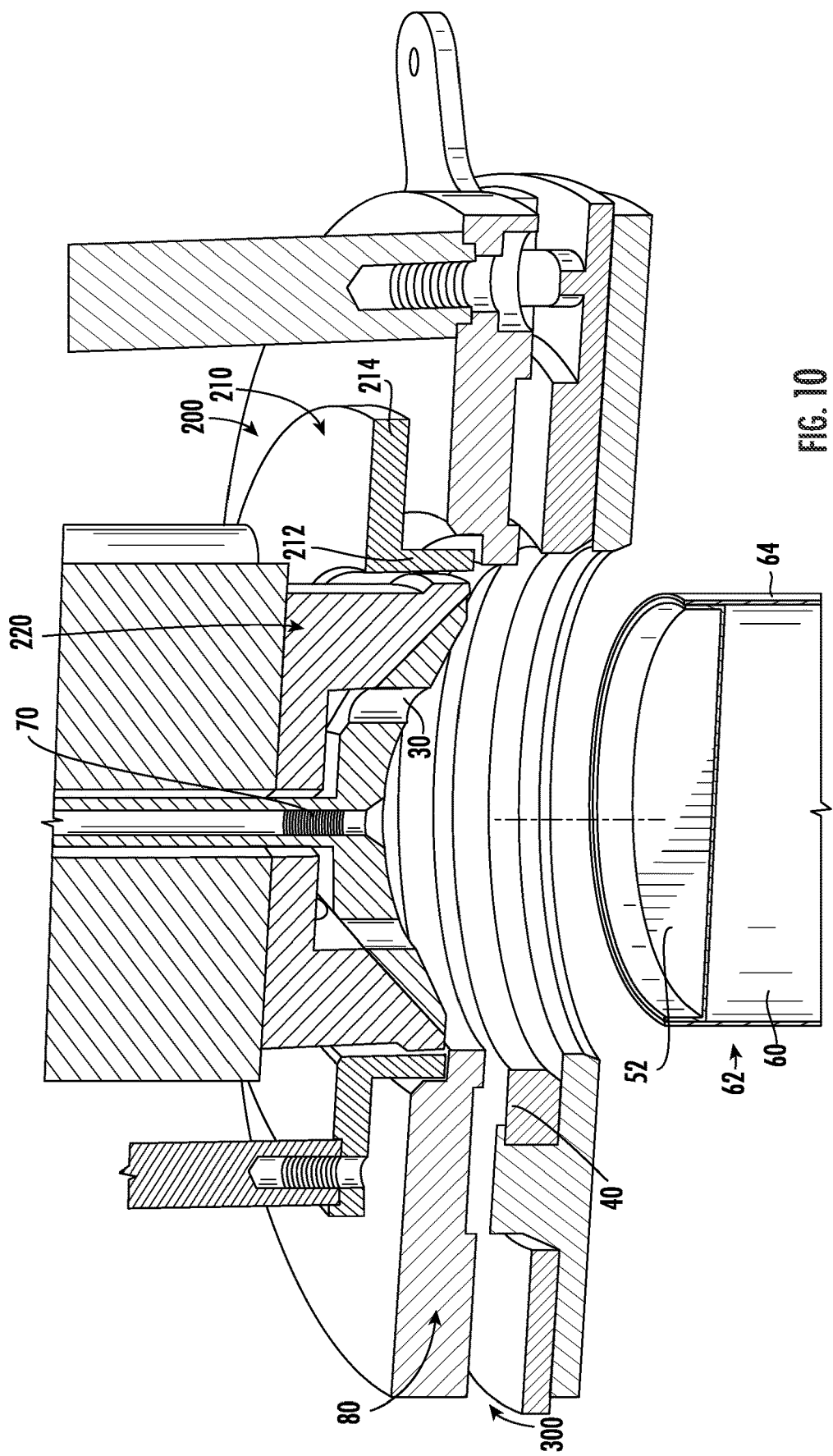
FIG. 10 illustrates an exemplary sealing system in accordance with an embodiment of the invention.
Figure 11:
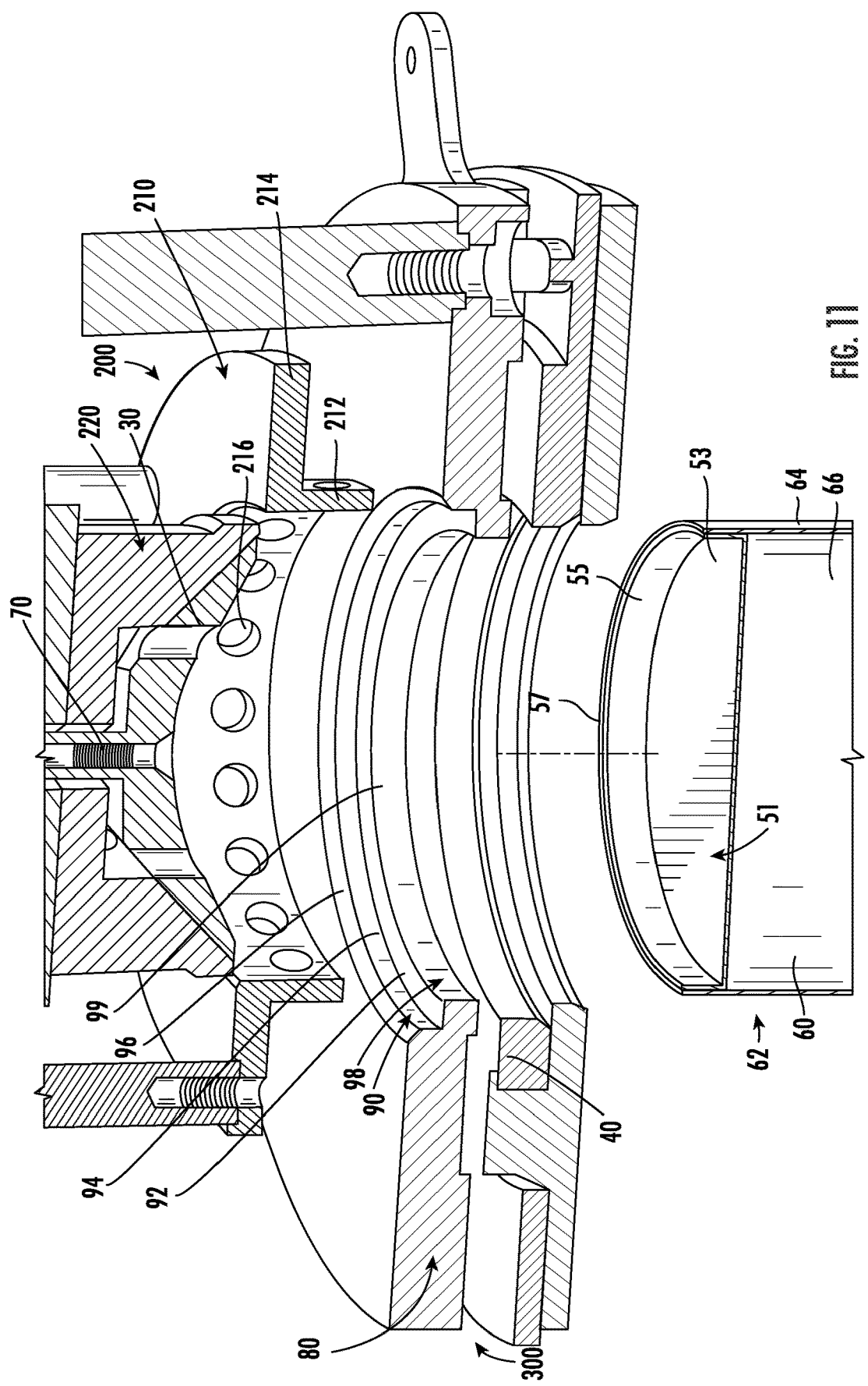
FIG. 11 illustrates an exemplary sealing system in accordance with an embodiment of the invention.

After retraction of both the inner mandrel 220 and the ejector 30, the container may be removed from the die assembly 300 and the mandrel assembly 200, optionally in a vertically downward manner (FIG. 10). In an embodiment, the inner mandrel 220 and outer mandrel 210 may then fully retract vertically upwardly from the die assembly 300, optionally in a unitary manner (FIG. 11). In an embodiment, the mandrel assembly 200 and the die assembly 300 are then positioned for another insertion, bottom closure formation, and sealing process.

Container Support Assembly

The container support assembly may be configured to retrieve and/or retain a composite body 60 and hold the composite body 60 in a desired location. The container support assembly may comprise a tube support member that is shaped to accept the composite body 60. In an embodiment, the tube support member may lift the container 60 upwardly vertically to meet the die assembly 300 and the mandrel assembly 200.

Figure 2:
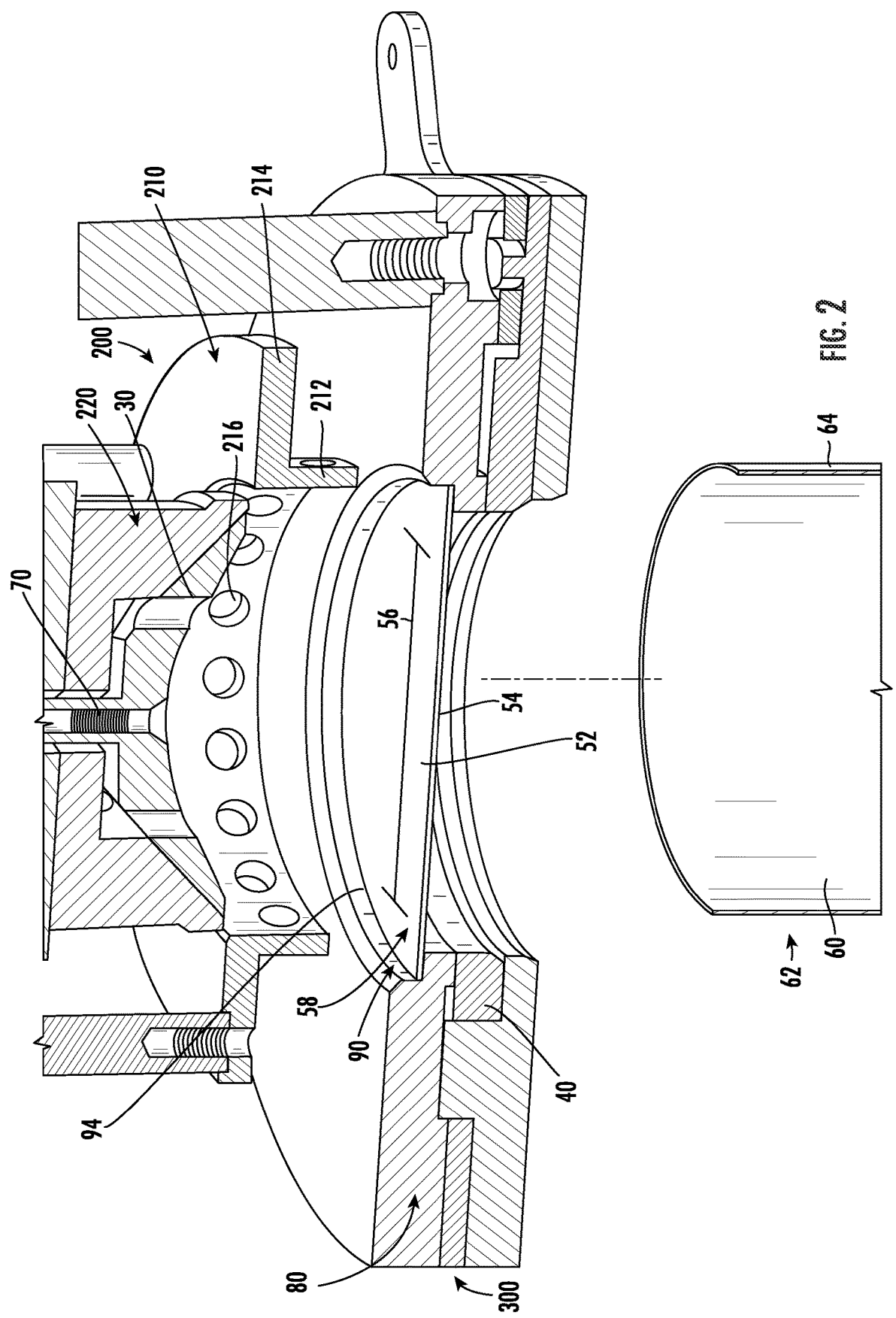
FIG. 2 illustrates an exemplary sealing system in accordance with an embodiment of the invention.
Figure 3:
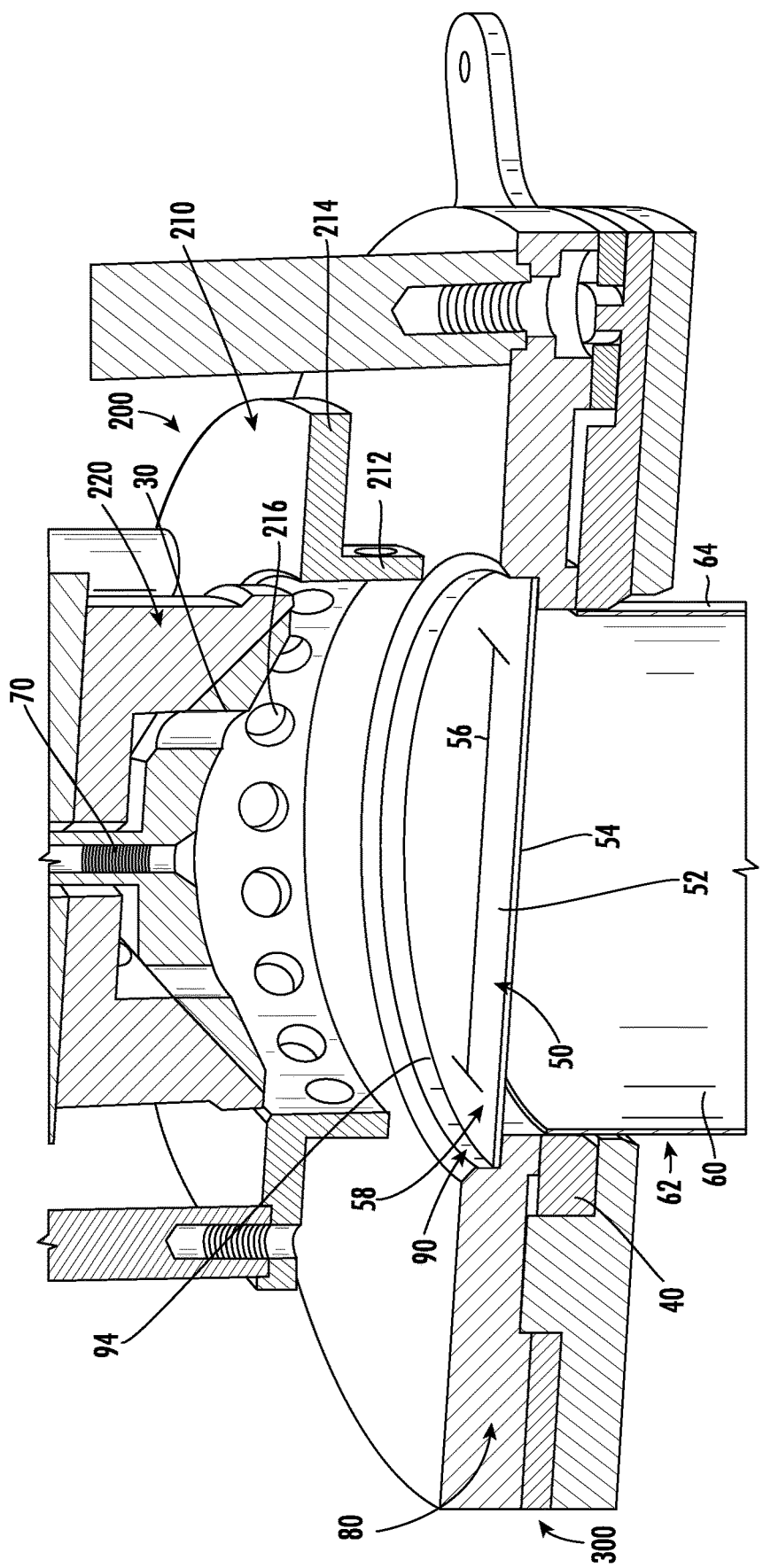
FIG. 3 illustrates an exemplary sealing system in accordance with an embodiment of the invention.
Figure 4:
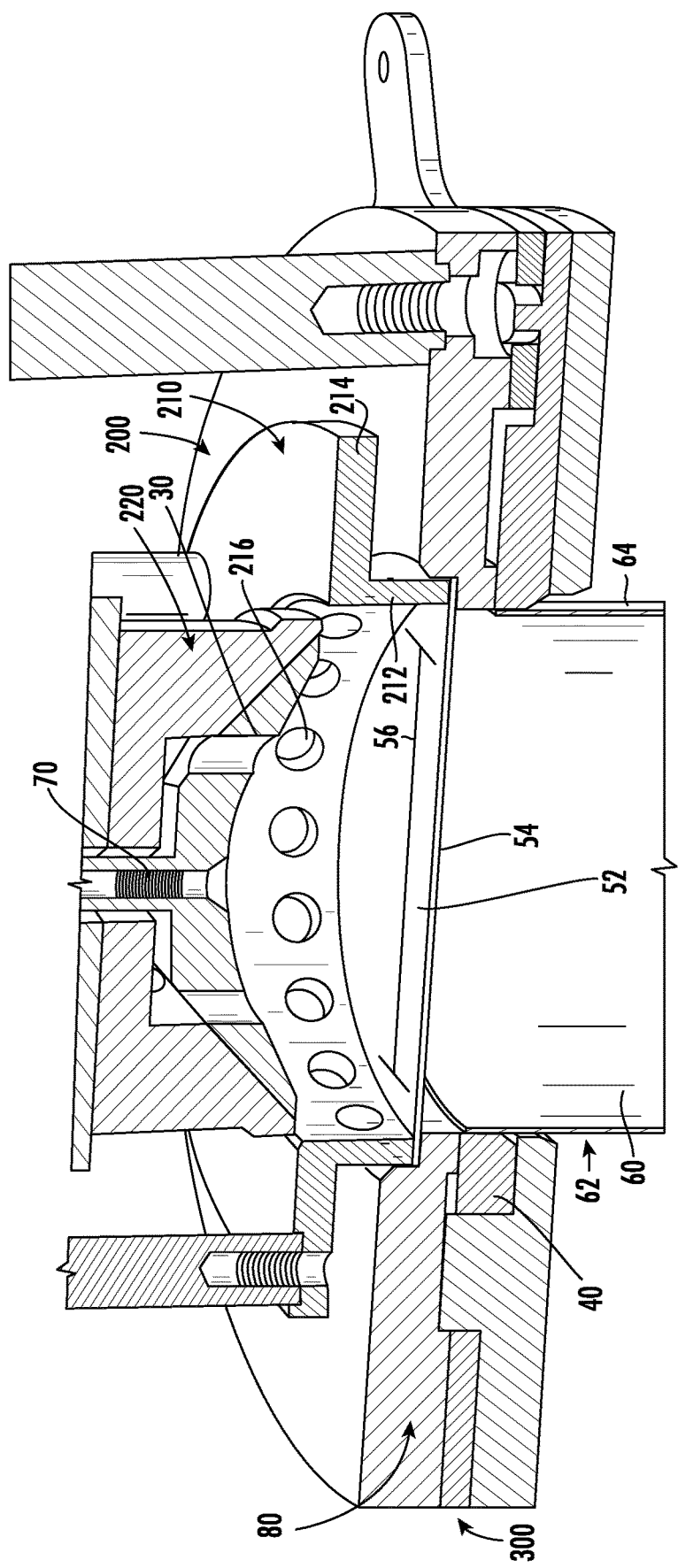
FIG. 4 illustrates an exemplary sealing system in accordance with an embodiment of the invention.
Figure 5:
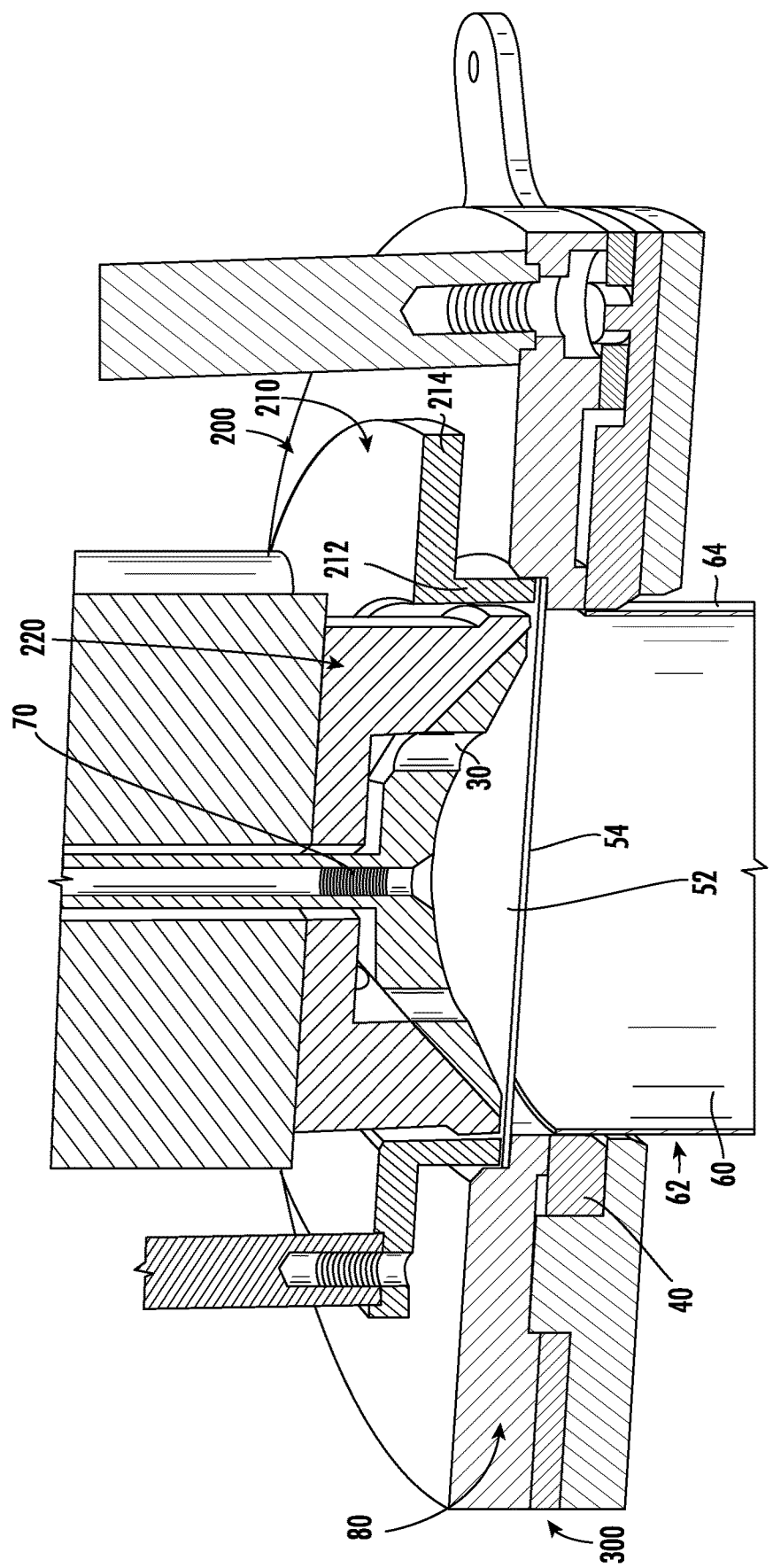
FIG. 5 illustrates an exemplary sealing system in accordance with an embodiment of the invention.
Figure 6:
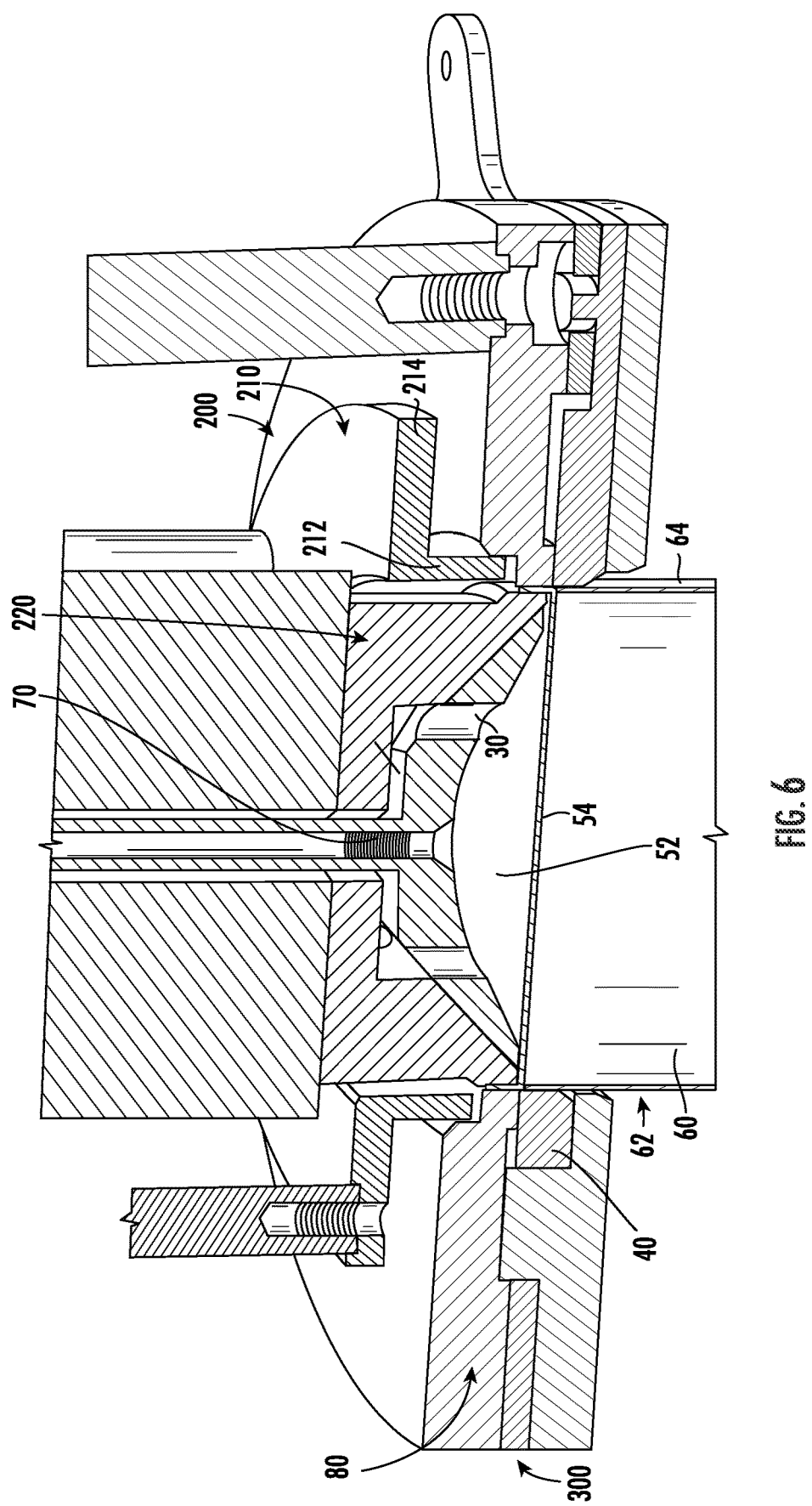
FIG. 6 illustrates an exemplary sealing system in accordance with an embodiment of the invention.
Figure 7:
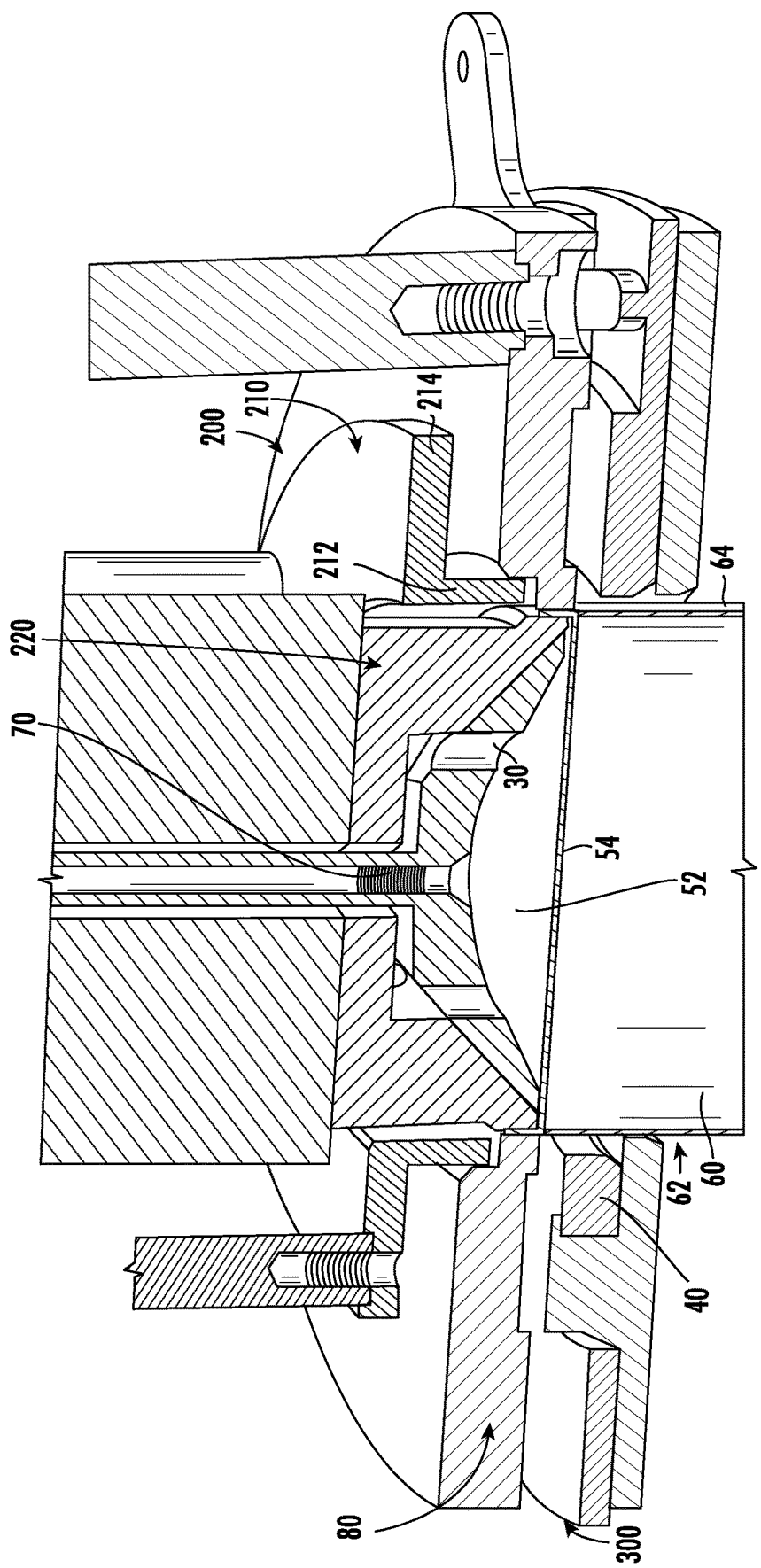
FIG. 7 illustrates an exemplary sealing system in accordance with an embodiment of the invention.
Figure 8:
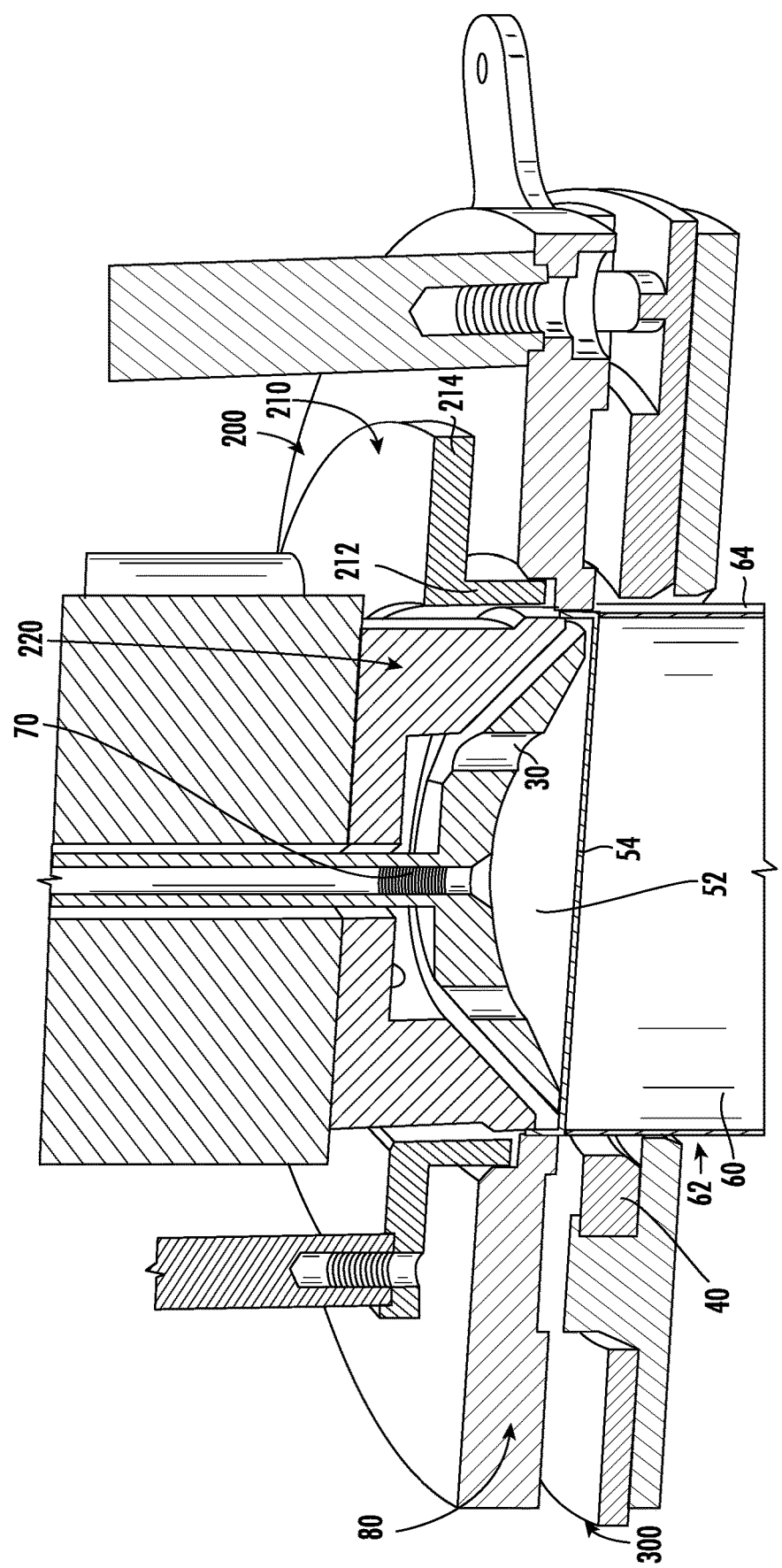
FIG. 8 illustrates an exemplary sealing system in accordance with an embodiment of the invention.
Figure 9:
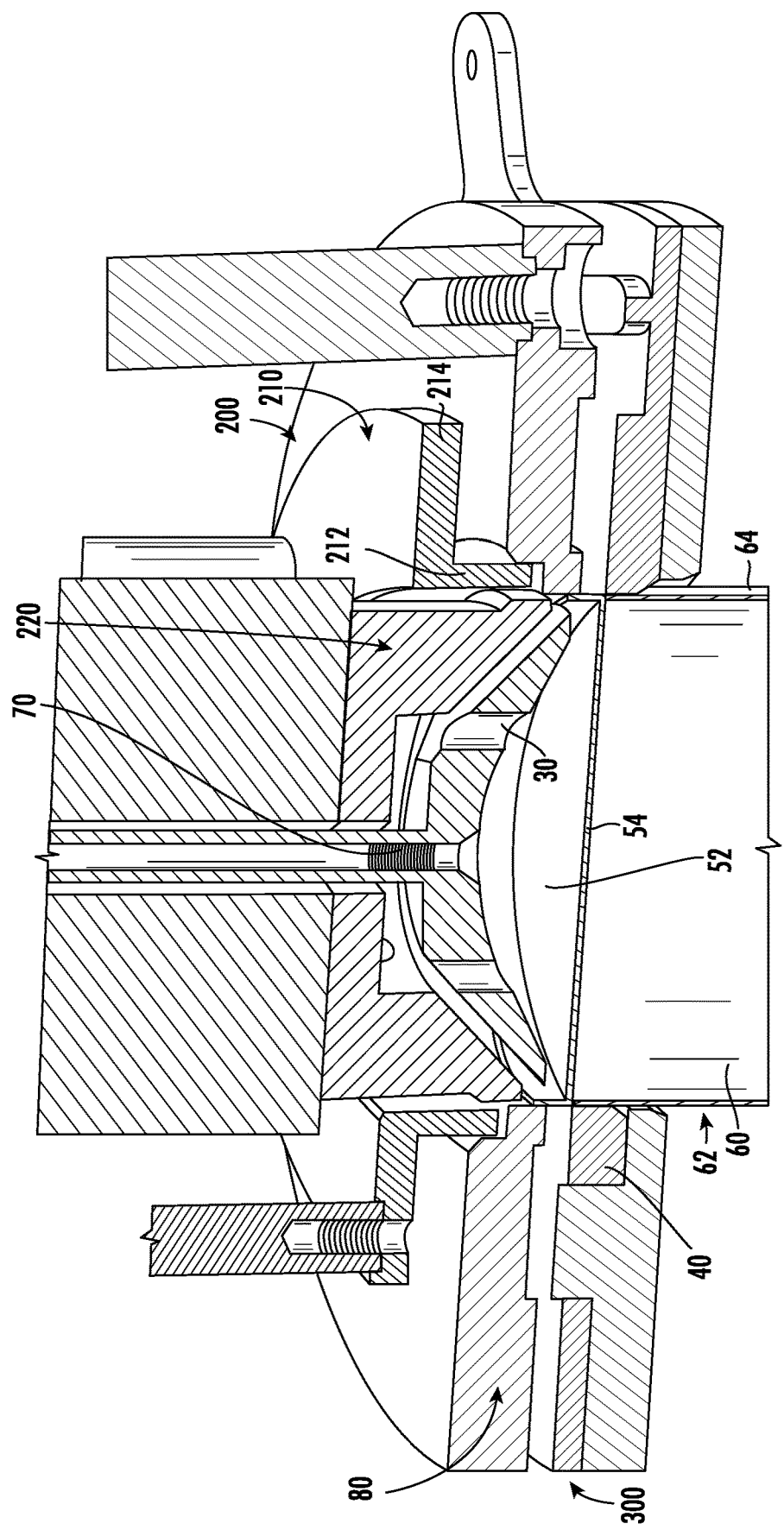
FIG. 9 illustrates an exemplary sealing system in accordance with an embodiment of the invention.

In an embodiment, the container 60 will be inserted into the die assembly by lifting upwardly and will be fixed in the vertical position in the die assembly by contacting the rim or edge of the container 60 with the lower surface of the die opening 98 (see FIG. 2-3). The container 60 will be in a secured position to avoid relative vertical movements of the container 60 while the inner mandrel 220 moves in and out of the container assembly.

Closure

As shown in FIG. 2, in an embodiment, the paper-based disc 50 may have an upper surface 52 and a lower surface 54 that define a sheet thickness. The paper-based disc 50 may comprise a layered structure in an embodiment, i.e., a fiber layer, an oxygen barrier layer and a sealant layer. The paper-based disc 50 may comprise a central portion 56 and a peripheral portion 58. The central portion 56 and the peripheral portion 58 may be substantially flat, in an embodiment. For example, the paper-based disc 50 may be cut or shaped into a circular disc. In other examples, the paper-based disc 50 may be cut or formed into a domed disc (not depicted) such that the central portion 56 is offset along the Y-axis from the perimeter portion 58.

After formation, the paper-based disc 50 becomes a bottom closure 51 (FIG. 11). The bottom closure 51 may have a first deformed surface 53 and a second deformed surface 53. The first deformed surface 53 may be substantially horizontal, in an embodiment. In an embodiment, the first deformed surface 53 comprises the central portion 56 of the paper-based disc. In another embodiment, the second deformed surface 55 may be substantially vertical and/or may comprise the peripheral portion 58 of the paper-based disc. In an embodiment, the first deformed surface 53 may be adjacent the interior cavity of the container 60 and the second deformed surface 55 may be adjacent the interior surface 66 of the container 60 sidewall.

Method

In use, the sealing system 100 accepts a disc 50 and seats the disc 50 within the positioning portion 90 of the die assembly 300, optionally using a vacuum pressure to properly seat the disc. In an embodiment, a container 60 is then lifted via lifting plates toward the die assembly 300 until the peripheral edge of the container 60 contacts the lower surface of the die 80. In this embodiment, the container inner sidewall 66 may be flush with the die opening 98. The outer mandrel 210, in an embodiment, is then vertically translated downwardly toward the disc 50 until the outer mandrel 210 contacts the peripheral portion 58 of the disc 50, retaining it in place. The movement of the outer mandrel 210 downwardly may occur in concert (i.e. in a unitary movement) with that of the inner mandrel 220 and the ejector 30.

Once the outer mandrel 210 is seated adjacent the disc 50, atop the disc support surface 92, the inner mandrel 220 and the ejector may continue to translate vertically downward toward the disc 50. The inner mandrel 220 and the ejector may then contact the disc 50 and urge the disc 50 downwardly, through the die opening 98, until the disc 50 becomes deformed such that it has a flat central portion and a deformed sidewall 55 adjacent the inner sidewall 66 of the container 60. In one embodiment, pressure may be applied to the disc by the first mandrel surface 222 and/or second mandrel surface 224 of the inner mandrel 220 (e.g., by actuating the inner mandrel 220 along the Y-direction).

The composite closure 51 may then be hermetically sealed to the container body 60. Specifically, compression and heat may be applied to the composite closure 51 and/or the container body 60 such that their respective sealant layers form a hermetic seal. In an embodiment, heat is provided via at least the sealing member(s) 40. Likewise, the sealing member(s) 40 and the second mandrel surface 224 of the inner mandrel 220 may provide opposing pressure to the exterior surface 64 of the container 60 and/or or the deformed sidewall 55 of the closure 51.

Hermetic seals, according to the present disclosure, may be formed by sealing members 40 at a temperature greater than about 90° C. such as, for example, 120° C. to about 280° C. or from about 140° C. to about 260° C. Suitable hermetic seals may be formed by keeping the sealing member(s) 40 in contact with the bottom end 62 of the composite body 60 for any dwell time sufficient to heat a sealant layer to a temperature suitable for forming a hermetic seal such as, for example, less than about 5 seconds, from about 0.8 seconds to about 5.0 seconds or from about 1 second to about 4 seconds. The bottom closure 51 and the bottom end 62 of the composite body 60 may be compressed between the sealing members 40 and the inner mandrel 220 with any pressure less than about 30 MPa such as a pressure from about 1 MPa to about 22 MPa.

After compression and/or heat has been applied for a sufficient dwell time, the sealing members 40 may be moved away from the bottom end 62 of the container 60 such that the sealing members 40 are not in contact with the composite body 10 (FIG. 7) after the dwell time expires. The inner mandrel 220 may then be retracted from the closure 51, while the ejector 30 remains in place. Once the inner mandrel 220 at least clears the peripheral edge of the container 60, the ejector 30 is then retracted, optionally accompanied by a blast of pressurized air to aid in a smoot retraction process. The ejector 30 is then fully retracted into the interior of the inner mandrel 220. The container 60 is then moved away from the die assembly 300 and mandrel assembly 200, prior to, during, or after the full retraction of the mandrel assembly 200 from the die assembly 300.

In certain embodiments, a plurality of composite containers may be formed by a system or device suitable for processing multiple paper-based discs, bottom closures and composite containers in a synchronized manner. For example, a manufacturing system may include a plurality of mandrel assemblies, a plurality of die assemblies, and a plurality of tube support assemblies operating in a coordinated manner. Specifically, a turreted device with a plurality of sub-assemblies wherein each sub-assembly comprises a mandrel assembly, a die assembly, and a tube assembly may accept discs and process the discs simultaneously or synchronously. Depending upon the complexity of the turreted device, hundreds of separate composite containers may be manufactured per cycle in a coordinated manner. Thus, any of the processes described herein may be performed contemporaneously. For example, when each sub-assembly operates in a synchronous manner, each of the following may be performed contemporaneously: a first paper-based disc may be positioned above a die opening; a second paper-based disc may be constrained between a mandrel assembly and a die assembly; a third paper-based disc may be formed into a first bottom closure via insertion into a first composite body; and a third bottom closure may be hermetically sealed to a second composite body. Alternatively, any of the operations described herein may be performed simultaneously such as, for example, by a device having a plurality of sub-assemblies.

In an embodiment, the systems and methods of the present invention allow sealing system to operate at high speeds (e.g., over 300 containers per minute). In another embodiment, the systems and methods of the present invention allow sealing system to operate at a speed of at least 400 containers per minute. In still another embodiment, the systems and methods of the present invention allow sealing system to operate at a speed of at least 500 containers per minute.

It should be understood that the present disclosure provides for hermetically closed containers for packaging humidity-sensitive and/or oxygen-sensitive solid food products such as, for example, crisp carbohydrate-based food products, salted food products, crisp food products, potato chips, processed potato snacks, nuts, and the like. Such hermetically closed containers may provide a hermetic closure under widely varying climate conditions of high and low temperature, high and low humidity, and high and low pressure. Moreover, the hermetically closed containers can be manufactured according to the methods described herein via processes involving conductive heating technology with relatively low environmental pollution. The hermetically closed containers described herein may have high structural stability at low weight and be suitable for recycling.

EXAMPLES

In the following examples, paper-bottom containers of the invention (composite container, paper bottom, membrane cover, and overcap) were tested for various characteristics. The paper bottom of the tested containers comprised a flexible board (i.e. cup stock) as the paper layer (195 $g/m^2$ (0.3 mm thickness)), a tie layer, aluminum foil (8 µm) as a barrier layer, and an ionomer layer (32 $g/m^2$) as a sealant layer. In some containers, a PET layer was included to protect the aluminum barrier layer. In other embodiments, an aluminum barrier layer was not included. All versions passed the testing, as indicated below.

Example 1

In the high altitude testing, the inventive containers were placed into a sealed chamber and the pressure within the chamber was increased to at least 11 inHg over a period of about 10 minutes. If the containers can withstand up to 10 inHg (simulating the atmospheric pressure as containers travel over the Rocky Mountains) for at least 10 minutes, the containers passed the test. If not, the containers are listed as "missed". As used herein, "Rocker Bottoms Observed" means during the vacuum chamber confinement, the membrane and/or paper bottom domed due to the overpressure conditions, which is normal under such conditions. After removal from the container, the doming returned to neutral. Doming may constitute the membrane or paper bottom moving outwardly from the interior of the container such that it extends beyond the relevant cut edge of the container. A miss or failure includes a leak, a peeling membrane or paper bottom, a retained distortion after pressure is released, a split or delamination of a seam, a bursting of a membrane or paper bottom, and/or another other failure that would prevent the container from meeting hermeticity standards. If a membrane or paper bottom domes inwardly into the can upon pressure release, this may indicate a leakage failure. The test results are set forth below.

TABLE 1a

High Altitude Testing ("HAT") Results.

| Batch # | Batch Size | HAT (10" Hg/ 10 min) | Rocker Bottom Observed |
|---|---|---|---|
| 1 | 1027 containers | 0 missed | ~-11 inHg |
| 2 | 558 containers | 0 missed | ~-11 inHg |
| 3 | 435 containers | 0 missed | ~-11 inHg |
| 4 | 550 containers | 0 missed | ~-11 inHg |
| 5 | 232 containers | 7 missed | ~-11 inHg |
| 6 | 258 containers | 1 missed | ~-11 inHg |
| 7 | 1667 containers | 16 missed | ~-11 inHg |
| 8 | 193 containers | 5 missed | ~-11 inHg |

The testing indicated a 99.4% success rate for the paper bottoms as described herein, which is acceptable.

TABLE 1b

High Altitude Testing Results

| Batch # | Batch Size | HAT Failure | Rocker Bottom Observed |
|---|---|---|---|
| Standard Laminates | | | |
| 1 | 20 containers | 0 missed Failure at −15.8 in Hg | ~-13 inHg |
| 2 | 20 containers | 0 missed Failure at −15.4 in Hg | −13 to −14 inHg |
| 3 | 25 containers | 1 missed Failure at −14.5 in Hg | n/a |
| 4 | 25 containers | 2 missed Failure at −13.5 in Hg | n/a |
| 5 | 25 containers | 0 missed Failure at −14.8 in Hg | −12 to −13 inHg |
| 6 | 25 containers | 0 missed Failure at −14.8 in Hg | −13 to −14 inHg |
| 7 | 10 containers | 0 missed Failure at −14.5 in Hg | −11.6 inHg AVG |
| 8 | 10 containers | 0 missed Failure at −15.7 in Hg | −11.4 inHg AVG |
| Light Weight Laminates | | | |
| 11 | 10 containers | 0 missed Failure at −16.2 in Hg | −9.8 inHg |
| 12 | 10 containers | 0 missed Failure at −16.4 in Hg | −9.5 inHg |

TABLE 1b-continued

High Altitude Testing Results

| Batch # | Batch Size | HAT Failure | Rocker Bottom Observed |
|---|---|---|---|
| 13 | 10 containers | 0 missed Failure at −14.7 in Hg | −9.5 inHg |
| 14 | 10 containers | 0 missed Failure at −13.8 in Hg | −8.8 inHg |

The testing indicated a 98% success rate for standard laminates and a 100% success rate for lightweight paper bottoms as described herein, which is acceptable.

Example 2

In this example, inventive containers were subjected to helium leak testing. Helium can be used as a tracer gas to detect leaks because it constitutes only about 5 ppm in the atmosphere, so background levels are very low. Helium has also relatively low mass so that it is mobile and is completely inert/non-reactive. The sealed inventive containers were placed in a sealed vacuum chamber and the vacuum chamber was then flooded with helium at 130 mbar. A sniffer/leak detector was connected to the container so that a sample of gas from within the container could be drawn off and passed through a mass spectrometer to read increases over the background reading of helium levels in the container. In this example, the helium leakage limit was $2.3 \times 10^{-4}$ mbar*l/sec. A success rate of 99.8% was observed. This result is acceptable.

TABLE 2

Helium Leak Testing ("HLT") Results

| Batch # | Batch Size | HLT (130 mbar); limit: $2.3*10^{-4}$ mbar*l/sec | Rocker Bottom Observed |
|---|---|---|---|
| 1 | 1027 containers | 2 missed | None |
| 2 | 558 containers | 2 missed | None |

Example 3

In this example, inventive containers were subjected to container integrity testing. The containers were placed under 200 mbar pressure in a vacuum chamber and vacuum decay was measured over a 20 second period. The method uses a pressure change measurement to indirectly determine the flow from the container into the fixed volume chamber. The mass extraction variant measures the flow required to maintain the vacuum at a fixed level (ASTM F2338 and ASTM F 3287). If the container has a leak, it will reduce the expected vacuum inside the vacuum chamber. The vacuum drop or decay was measured per second. The success/failure threshold was set at 42 Pa/s. A success rate of 98.6% was observed. This result is acceptable.

TABLE 3

Container Integrity Test ("CIT") Results

| Batch # | Batch Size | CIT (200 mbar, 20 sec) | Rocker Bottom Observed | Failure Type |
|---|---|---|---|---|
| 1 | 10 containers | 0 missed | none | none |
| 2 | 10 containers | 0 missed | none | none |
| 3 | 14 containers | 0 missed | none | none |
| 4 | 14 containers | 0 missed | none | none |
| 5 | 60 containers | 2 missed | none | none |
| 6 | 35 containers | 0 missed | none | none |
| 7 | 3247 containers | 44 missed | none | none |

Example 4

In this example, inventive containers were subjected to container Periodic Test Interval ("PTI") testing. The containers were placed under 700 mbar pressure in a vacuum chamber and vacuum decay was measured over a 20 second period. The vacuum drop or decay was measured per second. The success/failure threshold was set at 20 Pa/s. A success rate of 96% was observed. This result is acceptable.

TABLE 4

PTI Testing Results

| Batch # | Batch Size | PTI (700 mbar, 20 sec) | Rocker Bottom Observed | Failure Type |
|---|---|---|---|---|
| 1 | 26 containers | 1 missed | none | none |
| 2 | 25 containers | 1 missed | none | none |

Example 5

In this example, the inventors analyzed simulated shelf life of the inventive containers. The containers were filled, sealed, and stored having a residual oxygen level of 0.0%. The containers were then tested for residual oxygen levels after 6 months and 9 months. The success/failure threshold was set at less than or equal to 2.0% residual oxygen over these time periods (a threshold of 4.0%-4.5% may be acceptable after about 18 months). A success rate of 92% was observed. This result is acceptable.

TABLE 5

Simulated Shelf Life Results

| Container Age | Batch Size | Measured Residual Oxygen in Containers that Passed | Failures |
|---|---|---|---|
| 6 months | 19 containers | Between 0.32% and 0.34% | 3 missed (due to mechanical damage to the container) |
| 6 months | 39 containers | 0.0% | 4 missed |
| 9 months | 39 containers | 0.0% | 1 missed |

Example 6

Figure 29:
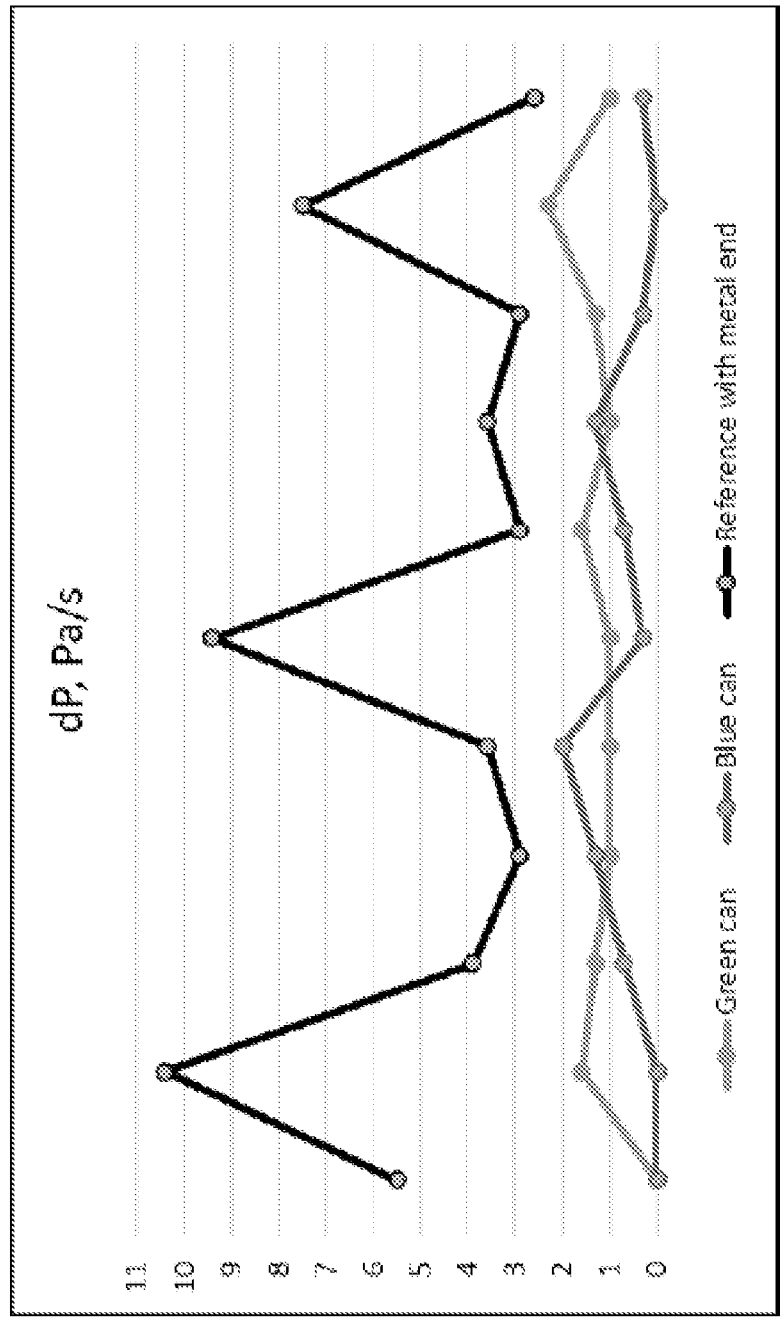
FIG. 29 illustrates a graph comparison of leak detection in inventive paper bottom closures as compared to metal bottom closures.

In this example, the inventors compared the leakage of containers having the inventive paper bottom closures to containers having a metal bottom closure using the vacuum decay methods described herein. The drop in pressure was measured in Pa/s for the cans. The "blue" and "green" cans are paper bottom containers while the "Reference with metal end" comprises metal bottom containers. As can be seen, the paper bottom containers have overall less pressure drop during the vacuum decay than the containers having metal bottom ends. FIG. 29 illustrates a graph of the results. Overall, the paper bottoms of the invention outperformed the metal bottoms in terms of consistency of avoiding leaks.

What is claimed is:

1. A sealing system for hermetically sealing a closure to a container comprising:
   a die assembly comprising:
      a die having a positioning portion configured to retain a disc and a die opening adjacent the positioning portion; and
      at least one sealing member configured to provide heat to seal the disc to the container; and
   a mandrel assembly comprising:
      an outer mandrel comprising an extending portion which is sized to fit within an inner circumference of the positioning portion;
      an inner mandrel configured to translate through an inner circumference of the extending portion of the outer mandrel and the die opening; and
      an ejector disposed within an inner circumference of the inner mandrel,
   wherein at least the outer mandrel is configured to translate a first distance in a first time period,
   wherein the inner mandrel and the ejector are configured to translate a second distance in a second time period,
   wherein the inner mandrel is configured to retract a third distance in a third time period and wherein the ejector does not retract during such third time period,
   wherein the ejector is configured to retract the third distance in a fourth time period which occurs later than the third time period, and
   wherein each of the first distance, the second distance, and the third distance are different from each other.

2. The system of claim 1 wherein the closure is paper-based.

3. The system of claim 1 wherein the sealing member is configured to provide pressure to an exterior surface of the container.

4. The system of claim 1 wherein the sealing member is disposed below the die.

5. The system of claim 1 wherein the extending portion of the outer mandrel has a greater circumference than that of the die opening.

6. The system of claim 1 wherein the outer mandrel is spring-loaded.

7. The system of claim 1, wherein the first distance is less than the second distance.

8. The system of claim 1, wherein the inner mandrel, the outer mandrel, and the ejector translate in a unitary manner during the first time period.

9. The system of claim 1, wherein the inner mandrel and the ejector are configured to translate the second distance in the second time period in a unitary manner.

10. The system of claim 1, wherein each of the first time period, the second time period, the third time period, and the fourth time period are different from one another.

11. The system of claim 1, wherein the ejector comprises a means for delivering a controlled blast of air directed toward the closure.

12. The system of claim 1, wherein the outer mandrel, the inner mandrel, and the ejectors extend, translate, and retract parallel to one another.

13. The system of claim 1, wherein:
the outer mandrel extends vertically;
the inner mandrel translates vertically; and
the ejector translates vertically.

14. A method for hermetically sealing a closure to a container comprising:
providing a die assembly comprising:
a die having a positioning portion configured to retain a disc and a die opening adjacent the positioning portion; and
at least one sealing member configured to provide heat to seal the disc to the container; and
providing a mandrel assembly comprising:
an outer mandrel comprising an extending portion which is sized to fit within an inner circumference of the positioning portion;
an inner mandrel configured to translate through an inner circumference of the extending portion of the outer mandrel and the die opening; and
an ejector disposed within an inner circumference of the inner mandrel, translating at least the outer mandrel a first distance in a first time period,
translating the inner mandrel and the ejector a second distance in a second time period,
retracting the inner mandrel a third distance in a third time period wherein the ejector does not retract during such third time period,
retracting the ejector the third distance in a fourth time period which occurs later than the third time period, and
wherein each of the first distance, the second distance, and the third distance are different from each other.

15. The method of claim 14 wherein the sealing member is configured to provide pressure to an exterior surface of the container.

16. The method of claim 14 wherein the extending portion of the outer mandrel has a greater circumference than that of the die opening.

17. The method of claim 14 wherein the outer mandrel is spring-loaded.

18. The method of claim 14 wherein the first distance is less than the second distance.

19. The method of claim 14 wherein the inner mandrel, the outer mandrel, and the ejector translate in a unitary manner during the first time period.

20. The method of claim 14 wherein the inner mandrel and the ejector are configured to translate the second distance in the second time period in a unitary manner.

21. The method of claim 14 wherein each of the first time period, the second time period, the third time period, and the fourth time period are different from one another.

22. The method of claim 14 wherein each of the first time period, the second time period, the third time period, and the fourth time period are successive time periods.

23. The method of claim 14 wherein the ejector delivers a controlled blast of air directed toward the closure during retraction from the closure.

24. The method of claim 14, wherein the outer mandrel, the inner mandrel, and the ejectors extend, translate, and retract parallel to one another.

25. The method of claim 14, wherein:
the outer mandrel extends vertically;
the inner mandrel translates vertically; and
the ejector translates vertically.

26. The method of claim 14 wherein the closure is paper-based.

* * * * *